United States Patent
Uranaka

[19]

[11] Patent Number: 5,937,158
[45] Date of Patent: Aug. 10, 1999

[54] SYSTEM AND METHOD FOR CONNECTING PORTABLE MEDIA WITH NETWORK AND COMPUTER FOR USE WITH THE SYSTEM

[75] Inventor: Sachiko Uranaka, Tokyo, Japan

[73] Assignee: Matsushita Electric Industrial Co., Ltd., Osaka, Japan

[21] Appl. No.: 08/828,021

[22] Filed: Mar. 27, 1997

[30] Foreign Application Priority Data

Apr. 19, 1996 [JP] Japan ....................................... 8-98242

[51] Int. Cl.$^6$ ............................. G06F 11/00; G06F 13/00
[52] U.S. Cl. ............................................. 395/186; 705/26
[58] Field of Search ............................... 395/186, 188.01, 395/187.01, 200.31, 200.33; 705/26, 27, 29; 707/3, 6, 9, 10, 200

[56] References Cited

U.S. PATENT DOCUMENTS

| | | | |
|---|---|---|---|
| 5,542,087 | 7/1996 | Neimat et al. | 395/600 |
| 5,592,375 | 1/1997 | Salmon et al. | 395/207 |
| 5,611,066 | 3/1997 | Keele et al. | 395/427 |
| 5,694,546 | 12/1997 | Reisman | 395/200.9 |
| 5,696,965 | 12/1997 | Dedrick | 395/610 |
| 5,734,886 | 3/1998 | Grosse et al. | 395/604 |
| 5,752,245 | 5/1998 | Parrish et al. | 707/10 |
| 5,752,246 | 5/1998 | Rogers et al. | 707/10 |
| 5,758,078 | 5/1998 | Kurita et al. | 395/200.33 |

OTHER PUBLICATIONS

Kaulavkar et al. "Campus Wide Distributed Linrary Search System", IEEE Tencon, pp. 348–351, 1993.
Nikkei Multimedia; Dec. 1995.

*Primary Examiner*—Joseph E. Palys
*Attorney, Agent, or Firm*—Lowe Hauptman Gopstein Gilman & Berner

[57] ABSTRACT

The present invention aims to execute customization for each user in case portable media for computer published in large quantity are used in combination with a network. The information to control corresponding relation between portable media and users is substituted by media-identifying information 101 different for each medium among media-related information 100 set to the portable media in advance, and this is used for the control of the users. Thus, there is no need to register the users, and customization for each user can be improved.

32 Claims, 21 Drawing Sheets

FIG. 9

| TITLE INFORMATION | ISSUE NUMBER INFORMATION | LEARNING PROGRESS STATUS |
|---|---|---|
| 4-0123456 | A00000001 | UNIT 1.3 (2) ; 30 MINUTES |
| 4-0123456 | A00000002 | UNIT 2.5 (3) ; 4 HOURS |
| 4-0234567 | B00000010 | CHAPTER 4, SECTION 3 ; 7 HOURS |
|  |  |  |
|  |  |  |
|  |  |  |
|  |  |  |
|  |  |  |
|  |  |  |
|  |  |  |

FIG. 10

[BASIC DATA]

TITLE INFORMATION :　　　4-0123456

ISSUE NUMBER INFORMATION : A00000001

ALREADY LEARNT :　　　　UNIT 1.3 (2)

CUMULATIVE LEARNING TIME : 30 MINUTES

[INSTRUCTION DATA]

[UNIT 1.3 (3)]
→ [APPENDIX A ; pp. 35-39]
→ [UNIT 1 SUMMARY]

⟨ONE HOUR ELAPSED UP TO NOW ?⟩

YES → TODAY'S LESSON COMPLETED

NO → [APPENDIX A : pp. 40-45]

→ TODAY'S LESSON COMPLETED (1) USER INFORMATION NO. 1

SEX :                       NOT KNOWN

AGE :                       NOT KNOWN

LIVING PLACE :         NOT KNOWN

FAMILY MEMBERS :      NOT KNOWN

CATALOG SALES ROUTE : ○● CARD SERVICE

CATALOG SALE AREA :   KANTO AREA (2) USER INFORMATION NO. 2

SEX :                       FEMALE

AGE :                       35 YEARS OLD

LIVING PLACE :         SOUTHERN DISTRICT OF TOKYO

FAMILY MEMBERS :      NOT KNOWN

CATALOG SALES ROUTE : DIRECT MAILING

CATALOG SALES AREA :  KANTO AREA

FIG. 19

MOVING PICTURE DATA CONTROL FILE

DATA NAME : A00001.mpg
STARTING POSITION : 0000
ENDING POSITION : 1500
KEYWORDS : "ONION" / "CARROT" / "OXTAIL"
STARTING POSITION : 1501
ENDING POSITION : 2000
KEYWORDS : "LETTUCE" / "BEAN CURD" / "WAKAME SEAWEED" / "SESAME"

DATA NAME : A00002.mpg
STARTING POSITION : 0000
ENDING POSITION : 1000
KEYWORDS : "TARO" / "CARROT" / "CHICKEN" / "BURDOCK"

FIG. 23

MOVING PICTURE DATA CONTROL FILE

| | |
|---|---|
| DATA NAME : | A00001.mpg |
| STARTING POSITION : | 0000 |
| ENDING POSITION : | 1500 |
| KEYWORDS : | "ONION" / "CARROT" / "OXTAIL" |
| STARTING POSITION : | 1501 |
| ENDING POSITION : | 2000 |
| KEYWORDS : | "LETTUCE" / "BEAN CURD" / "WAKAME SEA-WEED" / "SESAME" |
| | |
| DATA NAME : | A00002.mpg |
| STARTING POSITION : | 0000 |
| ENDING POSITION : | 1000 |
| KEYWORDS : | "TARO" / "CARROT" / "CHICKEN" / "BURDOCK" |

SYSTEM AND METHOD FOR CONNECTING PORTABLE MEDIA WITH NETWORK AND COMPUTER FOR USE WITH THE SYSTEM

BACKGROUND OF THE INVENTION

1. Field of the Invention

The present invention relates to a system and a method for providing services to connect portable media with a network, i.e. to retrieve an information on a network based on information recorded in each of portable media for electronic computer published in large quantity or to change method of utilization for each medium at the instruction from an application on the network.

2. Description of the Related Art

Conventionally, floppy disk, CD-ROM, PD, etc. have been used as a portable medium for computers. As examples to connect it with an application software on a network, there are a system of shopping by placing a product catalog into CD-ROM or a system to have access to Internet home page having related information and to display it when the application in CD-ROM is being started.

First, description will be given on an example of catalog shopping. To perform catalog shopping, the user obtains a CD-ROM by purchasing it at a bookshop or by receiving direct distribution from mail order supplier. The CD-ROM thus obtained is placed into CD-ROM drive of a personal computer at hand to display the content of the catalog. When the user finds a favorite product, the user's wish to buy the product is communicated to the mail order supplier by starting communicating function of the personal computer. In some cases, catalog browser may be automatically started in the communication function of the personal computer. To pay for the price of the product, the number of the user's credit card is transmitted in advance, and the payment is made by utilizing the credit card. The number of credit card may be transmitted at the time of purchase or the amount may be paid by transfer to bank account later.

Next, description will be given on an example, in which the user has access to Internet home page from an application in CD-ROM. An example is given on the journal "Nikkei Multi-Media", December issue, 1995, pp. 86–89. In this example, a catalog is used as the application in CD-ROM as in the previous example. Because the catalog on CD-ROM is distributed only be several times annually, it may take some time until changes of price or specification, or addition of new products will be included in the catalog. Therefore, it is proposed to supplement the information in CD-ROM by Internet home page. In so doing, it is possible to utilize the catalog, which always offer the newest information.

However, in the conventional technique as described above, the same type of CD-ROM is distributed to all users. To include and reflect the past utilization history of each user to the action of the application, it is necessary to put number and to control the users by the service suppliers after distributing CD-ROM. The user must convey the user's own number to the application by storing the number in the personal computer or by inputting it each time. Here, the reflection of the past utilization history to the action of the application indicates direct use by displaying a list of purchase details in the past or indirect use by judging taste of each user from the details of purchase in the past and to change the showing mode of the catalog.

In case it is attempted to have access to Internet home page with the purpose of having access only to the relevant information and not to supplement the information in CD-ROM, it is only possible in the conventional technique to have access to a certain fixed home page stored in CD-ROM. For the case where address of the home page has been changed or the case where a new home page is opened, the user must wait until the next CD-ROM will be distributed or the user himself or herself must store the new information to the personal computer through maintenance.

To solve the above problem, it is an object of the present invention to provide services, in which, when the user tries to utilize information by connecting a portable medium for computer published in large quantity with a network, customization for each user can be automatically performed without forcing each user to do special work, i.e. by substituting the information to control the corresponding relationship between the portable medium and the user with a medium utilization information set in the portable medium in advance.

SUMMARY OF THE INVENTION

To solve the above problems, a system for connecting portable media with a network according to a first aspect of the present invention comprises portable media each recorded with a medium utilization information specific for each purpose, a first computer provided with media driving means for driving the portable medium, a second computer for providing a method to display and output media-related information related to content of said portable medium, and a network for connecting said first and said second computers, whereby at least media-identifying information for distinguishing said media from the other media is recorded as said media-utilizing information, said first computer at least comprises, in addition to said media driving means, information display and output means for displaying and outputting a first central control means for controlling overall operation, and a first information transmitting and receiving means for inputting and outputting information to and from the network, said second computer at least comprises a second central control means for controlling overall operation, information storage means for storing the information, a second information transmitting and receiving means for inputting and outputting to and from the network, object and method information generating means for generating data to be used for display and output of said media on said first computer and an object and method information to define a method to display and output based on said media-identifying information, and media-related information generating means for generating media-related information related to content of said media based on said media-identifying information and the information stored by said information storage means, and said information display and output means displays and outputs said media-related information and also displays and outputs the data in said portable media in accordance with an instruction described in said object and method information.

It is possible according to the system of the invention to utilize the fact that the media-identifying information is an information, which can uniquely identify the content of the portable media and the information to define display and output object of the portable media based on the media-identifying information, i.e. content of the portable media, and a display and output method is generated by another computer, which is connected to the network so that the content to be displayed and outputted of the portable media and the method to display and output are placed under control of other computer connected to the network. It is also possible that the information related to said portable media is generated by the other computer connected to the network based on the media-identifying information at the same time so that the related information can be obtained under the control of the other computer connected to the network. Further, it is possible that, when content of the portable media is displayed in cooperation with the network, special feature is provided for each of the portable media in the mode to show the portable media, and that new information not recorded in the portable media is presented to the user without the instruction from the user.

The second aspect of the present invention provides a system for connecting portable media with a network according to the first arrangement, wherein utilization history information of each of the portable media is stored by information storage means of the second computer, and the object and method information generating means generates object and method information using the media-identifying information of said portable medium and said history information, whereby the media-identifying information is considered as a user number, which can uniquely specify the user, and utilization history for each user number is stored in another computer connected to the network so that it is possible to generate content to be displayed and outputted of the portable medium and the method to display and output for each utilization history of the user, and also, it is possible to control in such manner that the information observed or heard already by the user is not displayed or that customization for each user can be achieved without relying on the instruction of the user and, in case the user has observed or heard a number of information, special measure is taken in deciding the mode to present such information.

The third aspect of the present invention provides a system for connecting portable media with a network according to the second arrangement, wherein, in addition to the media-identifying information as a part of media utilizing information, a user information is provided, which can lead to the information relating to quality of major users of the portable media, and it has a function to generate information relating utilization of said portable media and the network using said user information and the history information among the media-utilizing information in the second computer, whereby the user information showing quality of the major users of said portable media is provided in the media-utilizing information so that statistical analysis can be achieved by the second computer without specific instruction of the user.

The fourth aspect of the invention provides a system for connecting portable media with a network according to the first arrangement, wherein validity check value calculated using a part of the media-utilizing information is provided on a part of the media-utilizing information as a validity check information for checking the validity of the portable media, or validity check value generating means for calculating said validity check value is provided on a second computer or on another computer permitted by the second computer, or validity checking means for judging whether the portable medium is valid or not using at least said validity check information and a part of said media-utilizing information other than said validity check information, whereby:

the media-identifying information and the validity check information calculated from the media-identifying information are included in the media-utilizing information so that it is possible to judge whether it is correctly generated when utilizing said portable medium, and it is possible to interrupt the processing without providing service in case the portable medium is not correct, and it is possible to prevent illegitimate copying of the portable medium because the calculating method of the validity check information itself is kept in secrecy.

The fifth aspect of the invention provides a system for connecting portable media with a network according to the first arrangement, wherein the media-identifying information comprises a title information, which can uniquely specify the title, the issuer, year of issuance and content of the portable medium and an issue number information given to each title information, whereby:

only the issue number information is regarded as a number for specifying a primary user of said medium, and in case a new different title is used, the utilization history of the user can be controlled by distributing a portable medium, which has a media-utilizing information with different title information by the same issue number information.

The sixth aspect of the invention provides a system for connecting portable media with a network according to the first arrangement, wherein the portable medium is of rewritable type, utilization history information of said portable medium is stored in the portable medium by media driving means, the history information is transmitted from a first computer to a second computer, and the object and method information generating means is provided with a function to generate object and method information using the transmitted history information and the media-identifying information, whereby:

the utilization history information of the medium is stored in the medium itself, and the information defining the display and output content of the medium and the display and output method is executed by the second computer so that storage area of the second computer can be reduced.

The seventh aspect of the invention provides a system for connecting portable media with a network according to the first arrangement, wherein the portable medium is of rewritable type and comprises utilization certifying information calculating means for calculating utilization certifying information by uni-directional function using a password and media-identifying information as argument, a function for storing the utilization certifying information calculated by the utilization certifying information calculating means as a basic information for utilization certification to the portable medium using the media driving means, and a function to calculate utilization certifying information based on the password and the media-identifying information inputted when the portable medium is driven in the first computer or when the portable medium is driven, to compare the result with the basic information for utilization certification stored in the portable medium, and to judge whether they are equal to each other or not, whereby:

it is possible to prevent wiretapping of password and to avoid useless utilization of the network because user certification can be carried out by the first computer without using the network.

The eighth aspect of the invention provides a system for connecting portable media with a network, wherein keywords for relevant information retrieval are involved in relation to the data recorded in the portable medium, and it at least comprises a first computer provided with media driving means for driving the portable medium, a second computer group for providing media-related information relating to the content of the portable medium, a third computer for retrieving an information providing server, acting as a computer complying with the retrieval condition from the second computer group, and a network for connecting the first computer, the second computer group and the third computer, said first computer at least comprises, in addition to the media driving means, a first central control means for controlling overall operation, information display and output means for displaying and outputting information, and a first information transmitting and receiving means for inputting and outputting to and from the network, the second computer group at least comprises, in each of the computers, a second central control means for controlling overall operation, information storage means for storing information, and a second information transmitting and receiving means for inputting and outputting to and from the network, and the third computer comprises at least a third central control means for controlling overall operation, a third information transmitting and receiving means for inputting and outputting the network and server retrieval means for retrieving the information providing server based on the keywords, whereby:

there is no need for information retriever himself to input keywords for acquiring media-related information, and it is possible to obtain correct information sought by the information retriever because accuracy of the keywords is high, and, even when network address of the second computer is added, deleted or changed, the change can be maintained by the third computer, and there is no need for the information retriever to take special action.

The ninth aspect of the invention provides a system for connecting portable media with a network according to the eighth arrangement, wherein media utilizing information specific for each purpose is recorded in the portable medium, a title information is provided, which can uniquely specify title, issuer, year of issuance and content of the portable medium, as a part of the media-utilizing information, the first computer transmits the media-utilizing information, together with the keywords to the third computer, and the third computer retrieves network address of information providing server using the transmitted keywords and the title information, which is a part of the media-utilizing information, whereby:

it is possible to increase accuracy and efficiency of retrieval first by limiting the object to be retrieved by the title information.

The tenth aspect of the invention provides a system for connecting portable media of media-related information with a network according to the ninth arrangement, wherein there is provided a thesaurus for retrieval corresponding to the title information of the portable medium, whereby:

it is possible to increase accuracy and efficiency of retrieval by limiting the thesaurus using the title information.

The eleventh aspect of the invention provides a system for connecting portable media with a network according to the eighth arrangement, wherein the first computer is provided with means for storing information relating to a district where the first computer is used, the first computer transmits the information related to said district to the third computer, and the third computer retrieves network address of the information providing server using the transmitted keywords and the information related to said district, whereby:

in case it is desirable that the information to be retrieved is within the range of action of the user, it is possible to increase the possibility that the results to match the desire of the user are obtained because the information relating to the living area is used for retrieval of the second computer group.

The twelfth aspect of the invention provides a system for connecting portable media with a network according to the eleventh arrangement, wherein there is provided a thesaurus for retrieval to correspond to the information relating to a district, whereby:

in case it is necessary to retrieve the second computer using keywords having different calling name for each district, it is possible to increase accuracy of retrieval by properly using the thesaurus to match the information relating to the district.

The thirteenth aspect of the invention provides a system for connecting portable media with a network according to the eighth arrangement, wherein media-utilizing information specific to each portable medium is recorded on the portable medium in addition to the keywords, there is provided a network address information, which can induce all network addresses of the third computer as a part of the media-utilizing information, the first computer is provided with means for storing the information relating to the district where the first computer is used, the first computer determines the retrieval server, i.e. a computer to be connected among the third computer group, using the information relating to the district where the computer is used, and connection of the first computer with the retrieval server is automated, whereby;

it is possible to increase accuracy and efficiency of the searching by dispersing the third computer according to the district and by controlling the second computer, which provides media-related information in each district, and it is possible to alleviate congestion of the network by increasing the chance of network connection to the third computer and to reduce the cost for network connection by connecting to the third computer near the living area.

The fourteenth aspect of the invention provides a system for connecting portable media with a network according to the eighth arrangement, wherein media-utilizing information specific to each portable medium is recorded in the portable medium in addition to the keywords, there is provided a network address information, which induces network address of the third computer group, as a part of the media-utilizing information, the first computer is provided with means for storing the information related to the district where the first computer is used, the information related to the district is transmitted to the representative retrieval server, the representative retrieval server determines a retrieval server, which is the third computer for optimal retrieval in that district using the transmitted information relating to the district, and connection of the first computer with the retrieval server is automated, whereby:

it is possible to increase accuracy and efficiency of retrieval by dispersing the third computer according to the district and by controlling the second computer, which provides media-related information for each district, to alleviate congestion of the network by increasing the chance of network connection to the third computer and to reduce storage area by storing only the network address of the representative third computer to the portable medium.

BRIEF DESCRIPTION OF THE DRAWINGS

These objects and features of the present invention will become more readily apparent from the following detailed description of the preferred embodiments taken in conjunction with the accompanying drawings in which:

FIG. 9 shows examples of history control in the second embodiment;

FIG. 10 represents examples of script in the second embodiment;

FIG. 19 shows examples of keyword adding mode in the fourth embodiment of the invention;

FIG. 23 shows examples of keyword adding mode in the fifth embodiment of the invention.

DETAILED DESCRIPTION OF THE INVENTION

In the following, description will be given on embodiments of the present invention in connection with FIGS. 1 to 23.

Figure 1:
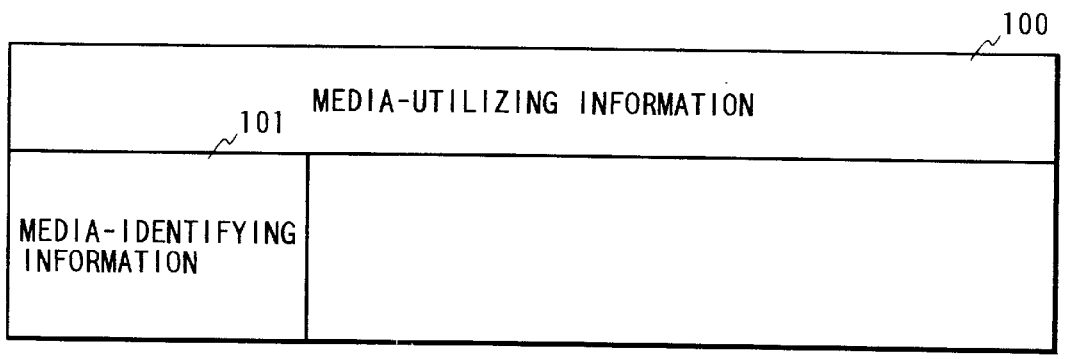
FIG. 1 shows minimum arrangement of media-utilizing information.

FIG. 1 shows a basic arrangement of media-utilizing information. Reference numeral 100 represents a media-utilizing information, and 101 represents a media-identifying information among the media utilizing information 100.

Figure 2:
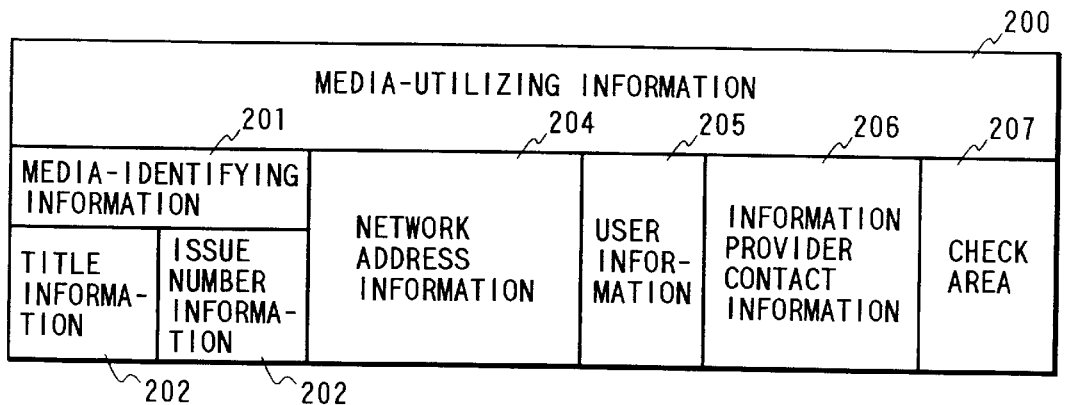
FIG. 2 is an example of maximum arrangement of media-utilizing information.

FIG. 2 shows an example of the maximum arrangement of the media-utilizing information having all of the information, which can be recorded in the media-utilizing information. Reference numeral 200 represents a media-utilizing information, 201 represents a media-identifying information among the media-utilizing information 200, 202 represents a title information which can uniquely specify title, issuer, year of issuance, content, etc. of the media among the media-identifying information 201, 203 represents an issue number information, which can be given to each title information 202 among the media-identifying information 201, 204 represents a network address information, which is utilized when service on the network is used, among the media-utilizing information 200, 205 represents a user information related to the user such as sex, age, living area, etc. of primary users of the media among the media-utilizing information 200, 206 represents an information provider contact information showing contact data such as address, telephone number, facsimile number, etc. of the information provider among the media utilizing information 200, and 207 represents a check area for storing validity check value calculated from only the media-identifying information 201 or from the media-identifying information 201, the network address information 204, the user information 205, and the information provider contact information 206 among the media-utilizing information 200.

In FIG. 2, area division of each information is logical division, and not physical division.

In the following, description will be given on five embodiments, referring to outline and mode of implementation of the services which can be offered using some or all of the media-utilizing information 200 shown in FIG. 2.

(Embodiment 1)

Figure 3:
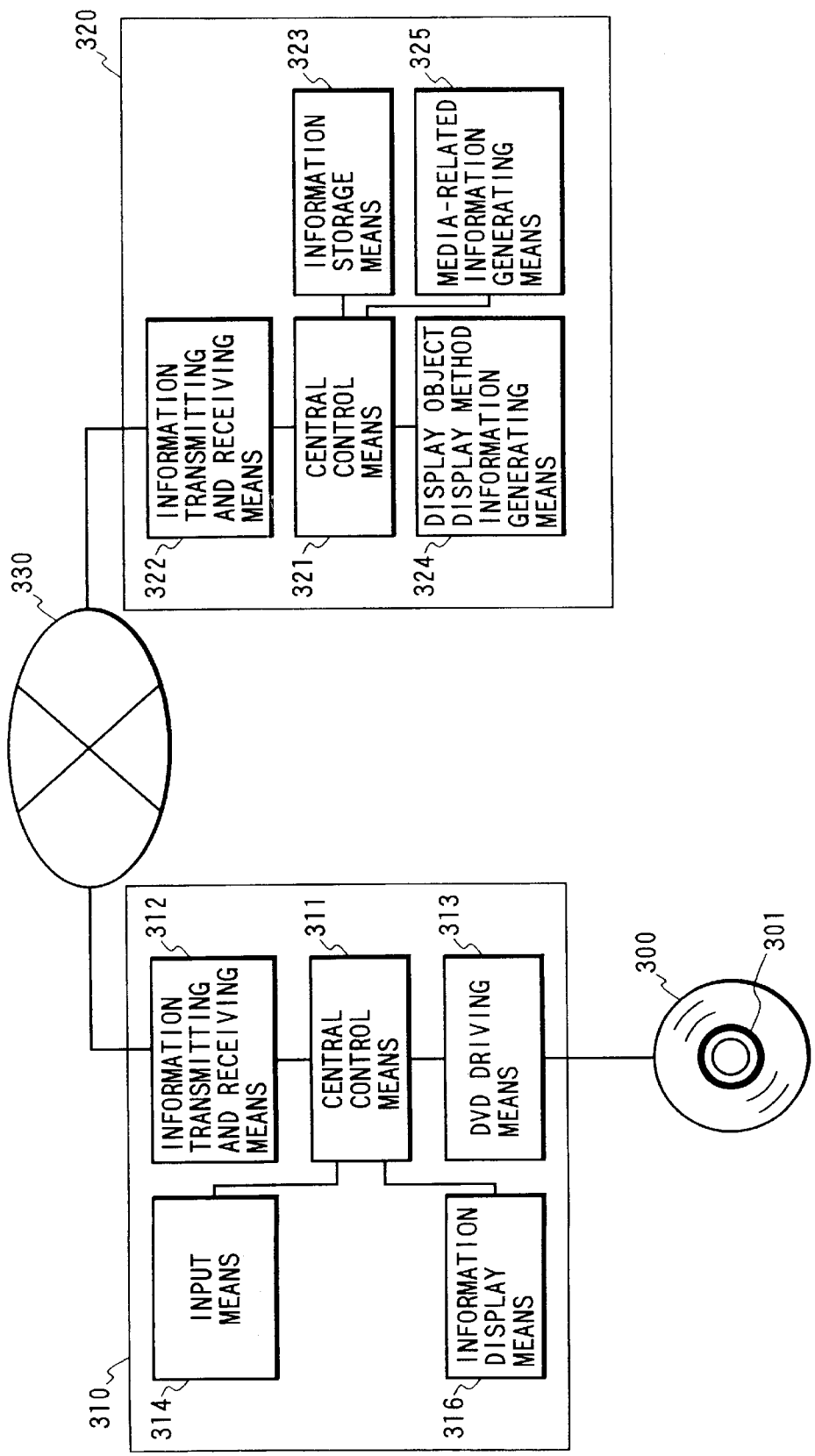
FIG. 3 represents an arrangement of an information providing system in a first embodiment of the present invention.

FIG. 3 represents an arrangement of an information providing system using a restaurant guide as a portable medium according to a first embodiment of the present invention. Here, a read-only digital video disk (abbreviated as "DVD") is used as the portable medium, and the media-utilizing information of the portable medium is recorded in a special-purpose area on DVD different from the original recording area in DVD. Hereinafter, this special-purpose area is referred as media-utilizing information recording area.

Reference numeral 300 represents a restaurant guide DVD, which includes information such as prices, contents, etc. of a restaurant over various categories, and reference numeral 301 represents a media-utilizing information recording area on DVD. Reference numeral 310 represents a restaurant guide client, which is computer at hand of a restaurant guide user, 311 represents a central control means for controlling overall operation of the restaurant guide client 310, 312 represents information transmitting and receiving means for transmitting and receiving information relating to a network of the restaurant guide client 310, 313 represents DVD driving means for driving the restaurant guide DVD 300, 314 represents input means such as keyboard, mouse, voice recognizer, tablet, pen, etc. which the user uses to input to the restaurant guide client 310, and 316 represents information display means which the restaurant guide client 310 uses for displaying to the user. Reference numeral 320 represents a restaurant guide server to provide restaurant guide service, 321 represents central control means for controlling overall operation of the restaurant guide server 320, 322 represents information transmitting and receiving means for transmitting and receiving information to the network of the restaurant guide server 320 to the network, 323 represents information storage means for storing necessary information by the central control means 321 of the restaurant guide server 320, 324 represents display object display method information generating means for generating display object display method information as to which of the information recorded in the restaurant guide DVD 300 should be displayed and how, and 325 represents media-related information generating means for generating media-related information, which is an information in shortage in the restaurant guide DVD 300 or an information to be conveyed by the restaurant guide server 320 in addition to the restaurant guide DVD 300. Reference numeral 330 is a network connecting the restaurant guide client 310 with the restaurant guide server 320.

Figure 4:
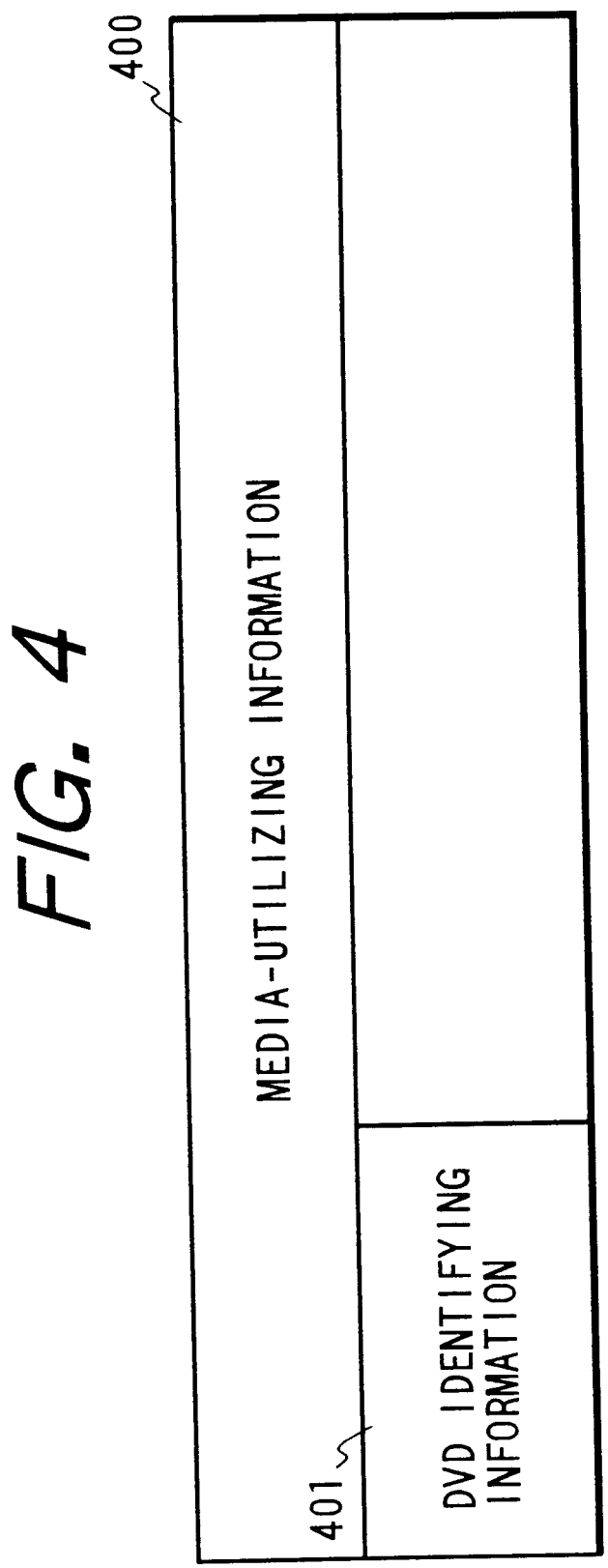
FIG. 4 shows an example of a media-utilizing information in the first embodiment.

FIG. 4 shows an arrangement example of media-utilizing information related to the first embodiment of the present invention. Reference numeral 400 represents a media-utilizing information, 410 represents a DVD identifying information, which can uniquely specify title, year of issuance, content, etc. of DVD and which corresponds to ISBN number used for books among the media-utilizing information 400. It is already recorded on the media-utilizing information recording area 301 of FIG. 3 when DVD is distributed.

Figure 5:
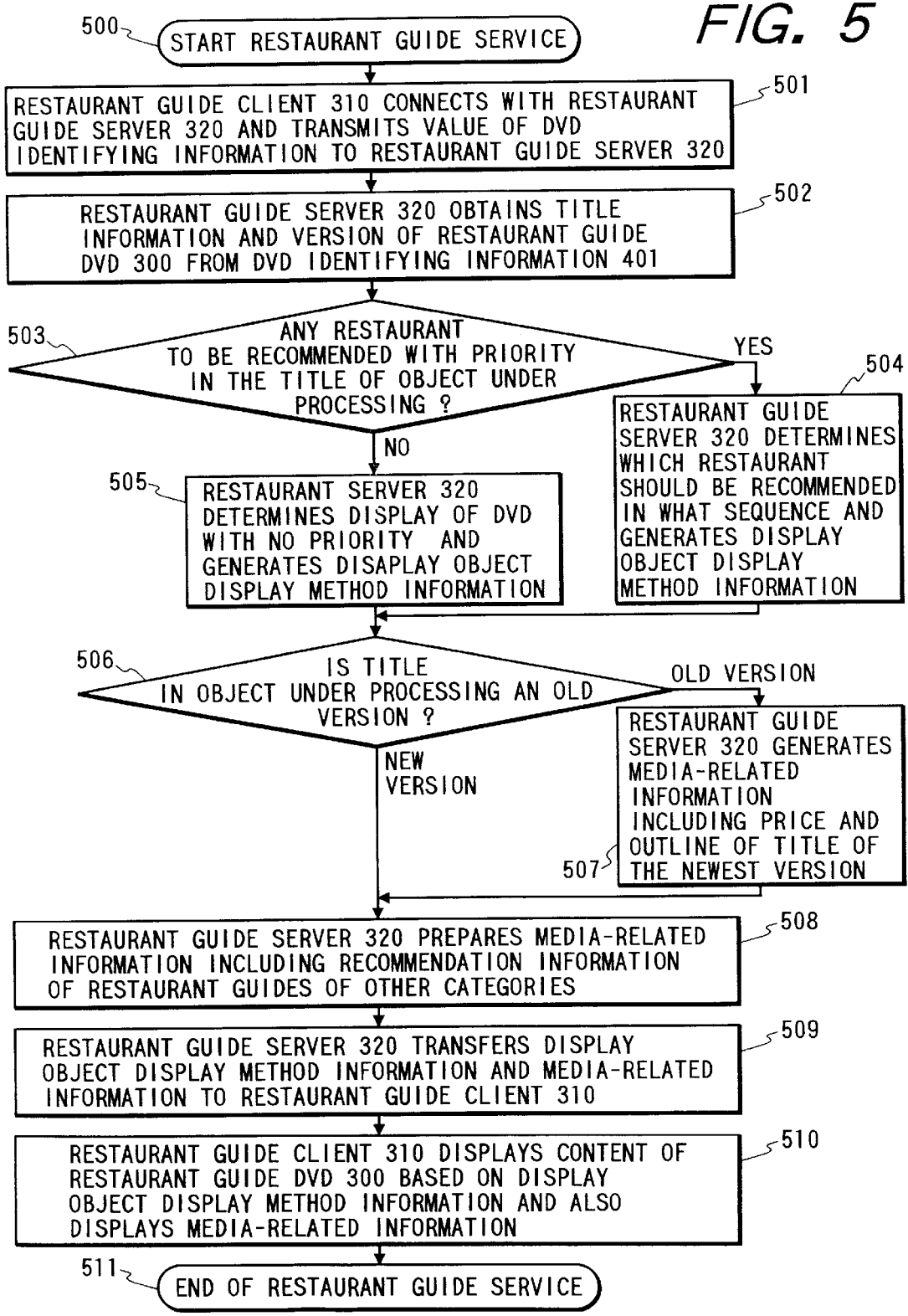
FIG. 5 is a flow chart showing operation of the first embodiment of the invention.

FIG. 5 is a flow chart showing a flow of processing in the first embodiment of the present invention.

In the following, description will be given on operation of the first embodiment of the present invention referring to FIG. 3 to FIG. 5.

The user obtains the restaurant guide DVD 300 by buying it at a bookshop or by mail order sale or at the distribution from a restaurant guide service provider.

Description is given now according to the flow chart of FIG. 5, referring to the case where the user receives restaurant guide service. In FIG. 5, a rectangle with round corners shows start or end of the flow chart, a rhombus indicates judgment, a rectangle indicates processing, and an arrow indicates flow of processing.

First, the user sets the restaurant guide DVD 300 to DVD driving means 313 of the restaurant guide client 310, and using the input means 314, the user instructs the central control means 311 of the restaurant guide client 310 to start the restaurant guide service. Then, as shown in the start 500, the restaurant guide service is started. Here, the user uses the input means 314 to input a network address of the restaurant guide server 320, and it is advanced to Step 501. In case it is designed that, when the restaurant guide DVD 300 is set to DVD driving means 313, it is always connected to the restaurant guide server 320, it is advanced to Step 501 without inputting the network address.

Next, as shown in Step 501, the central control means 311 of the restaurant guide client 310 is connected with the restaurant guide server 320 via the network 330. In this case, DVD identifying information 401 in the restaurant guide DVD 300 is transmitted to the restaurant server 320 using the information transmitting and receiving means 312, and it is advanced to Step 502.

Next, as shown in Step 502, the central control means 321 of the restaurant guide server 320 receives DVD identifying information 401 using the information transmitting and receiving means 322. Based on the identifying information, title information, year of publication, etc. are obtained from the information stored in the information storage means 323, and it is advanced to a judgment 503.

Next, as shown in the judgment 503, in case the publisher of the restaurant guide receives advertisement fee from a specific restaurant, a service is offered to recommend the restaurant. The central control means 321 of the restaurant guide server 320 checks whether or not there is a restaurant to be recommended with priority based on recommendation information, which is one of the information stored in the information storage means 323 with respect to the title of the object currently to be processed and recognizable by the title information obtained from DVD identifying information received. If there is a restaurant to be recommended, as shown in Step 504, the central control means 321 of the restaurant guide server 320 generates the display object display method information defining the object to be displayed and the displaying method such as display content and the point to be emphasized, which is needed to define as to how and in what sequence the restaurant should be recommended by the display object and display method information generating means 324. If there is none, as shown in Step 505, it is determined to display the content of DVD without any priority, and the display object display method information needed for the display is generated by the display object display method information generating means 324.

Next, as shown in the judgment 506, based on the title information and the year of publication obtained from the received DVD identifying information 401, the central control means 321 of the restaurant guide server 320 checks whether the title of the object currently under processing is old version or new version. In case it is an old version, based on the information stored in the second information storage means as shown in Step 507, relevant information including price and outline of the title of the newest version is generated as the media-related information by the media-related information generating means 325, and it is advanced to Step 508. In case it is a new version, the media-related information as the information relating to the new title is not needed, and it is advanced to Step 508. As shown in Step 508, recommendation information of restaurant guide of other category is generated as media-related information.

Next, as shown in Step 509, the central control means 321 of the restaurant guide server 320 uses the information transmitting and receiving means 322 and transmits display object display method information generated at Steps 504 or 505 and the media-related information generated at Steps 507 and 508 or in Step 508 from the restaurant guide server 320 to the restaurant guide client 310. The central control means 311 of the restaurant guide client 310 uses the information transmitting and receiving means 312 and receives the transmitted display object display method information and the media-related information.

Next, as shown in Step 510, under the control of the central control means 311 of the restaurant guide client 310, the media-related information received and the content of the restaurant guide DVD 300 are displayed by the information display means 316. In this case, the content of the restaurant guide DVD 300 is displayed based on the received display object display method information.

After the above processings have been completed, it is advanced to the end 511. The restaurant guide client 310 interrupts network connection with the restaurant guide server 320, and the restaurant guide service is terminated.

In the present embodiment, DVD is used as the portable medium, and media-utilizing information recording area on DVD is used as the recording area for the media utilizing information, while it is also possible to use the other media such as floppy disk or CD-ROM or rewritable DVD as the portable medium, or to use the recording area of the medium itself as the recording area for the media-utilizing information. As the network, it is possible to utilize LAN (local area network), WAN (wide area network), Internet, satellite network, etc.

Also, in the present embodiment, using the display object display method information and media-related information received by the information transmitting and receiving means 312, and under the control of the central control means 311 of the restaurant guide client 310, the content of DVD and media-related information are displayed by the information display means 316, while it is naturally possible that the restaurant guide client 310 is provided with information storage means, and the received information is stored once by the information storage means and is displayed thereafter.

In the present embodiment, a display used by the restaurant guide client 310 is used as the information display means 316, while it is not limited to this, and the information may be printed by a printer or may be downloaded to any type of recording medium.

(Embodiment 2)

Figure 6:
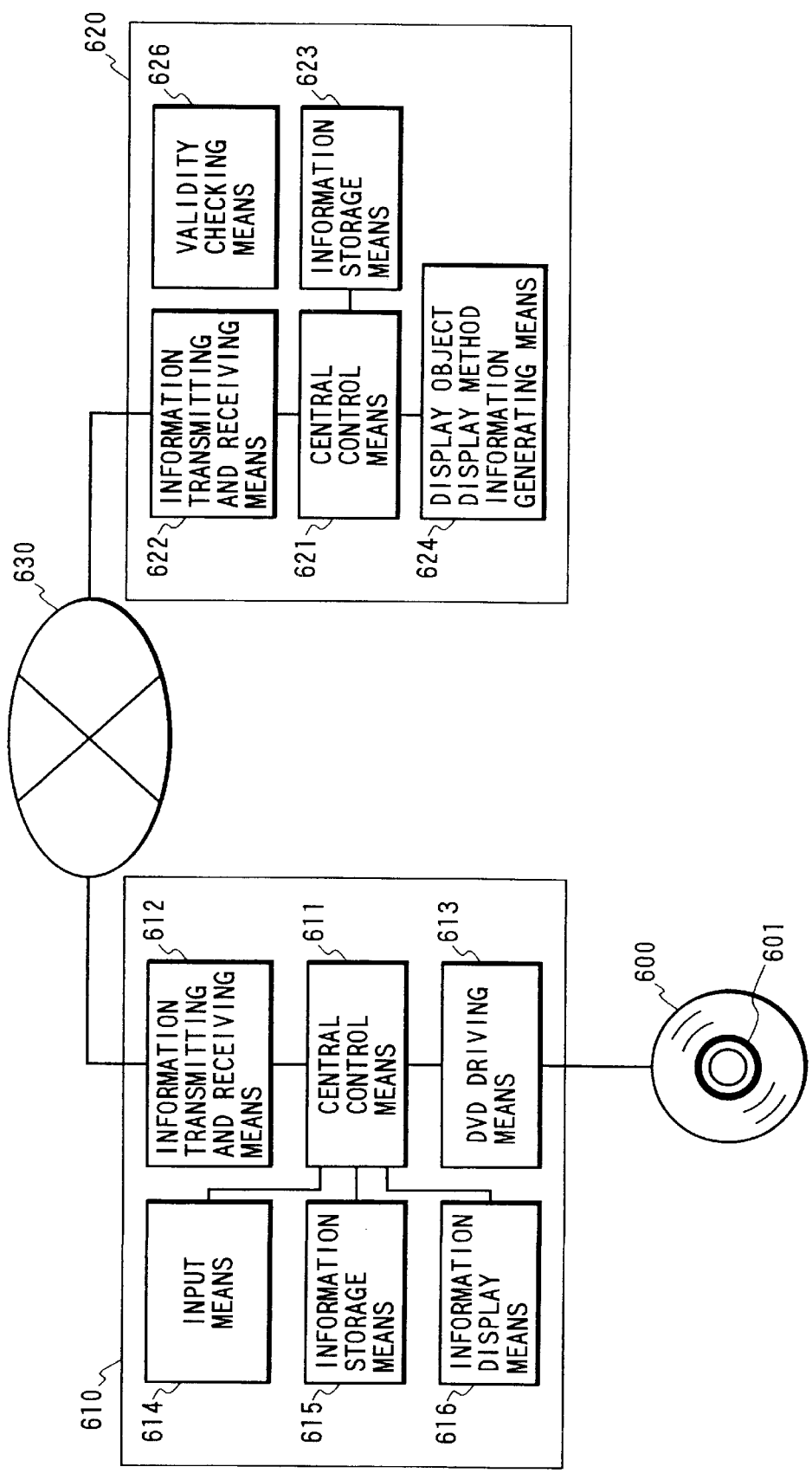
FIG. 6 shows an arrangement of correspondence education service in a second embodiment of the present invention.

FIG. 6 shows an arrangement of correspondence education system using an electronic textbook as the portable medium in the second embodiment of the present invention. In this case again, digital video disk (DVD) is used as the portable medium, and it is of read-only type as in the first embodiment. The media-utilizing information of the portable medium is recorded on a special-purpose area on DVD different from the original recording area in DVD. This special-purpose area is hereinafter referred as media-utilizing information recording area.

Reference numeral 600 represents an electronic textbook DVD, which includes reference materials related to the course, dictionary data and encoded test questions, and 601 represents a media-utilizing information recording area on DVD. Reference numeral 610 represents a correspondence education client, which is a computer at hand of a receiver of correspondence education course, 611 represents a central control means for controlling overall operation of the correspondence education client 610, 612 represents information transmitting and receiving means for transmitting and receiving information to and from the network of the correspondence education client 610, 613 represents DVD driving means of the correspondence education client 610 for driving the electronic textbook DVD 600, 614 represents input means such as keyboard, mouse, voice recognizer, tablet, pen, etc. which the correspondence education receiver inputs to the correspondence education client 610, 615 represents information storage means for storing necessary information by the central control means 611 of the correspondence education client 610, and 616 represents information display means such as display, which the correspondence education client 610 uses to display to the receiver of the correspondence education course. Reference numeral 620 represents a correspondence education server to offer correspondence education service, 621 represents central control means for controlling overall operation of the correspondence education server 620, 622 represents information transmitting and receiving means for transmitting and receiving information to and from the network of the correspondence education server 620, 623 represents information storage means for storing necessary information by the central control means 621 of the correspondence education server 620, 624 represents display object display method information for defining as to which of the information recorded in the electronic textbook DVD 600 is to be displayed and how, e.g. display object display method information generating means for generating script, and 626 represents validity checking means for judging whether the electronic textbook DVD 600 is valid or not. Reference numeral 630 represents a network, which connects the correspondence education client 610 with the correspondence education server 620.

Figure 7:
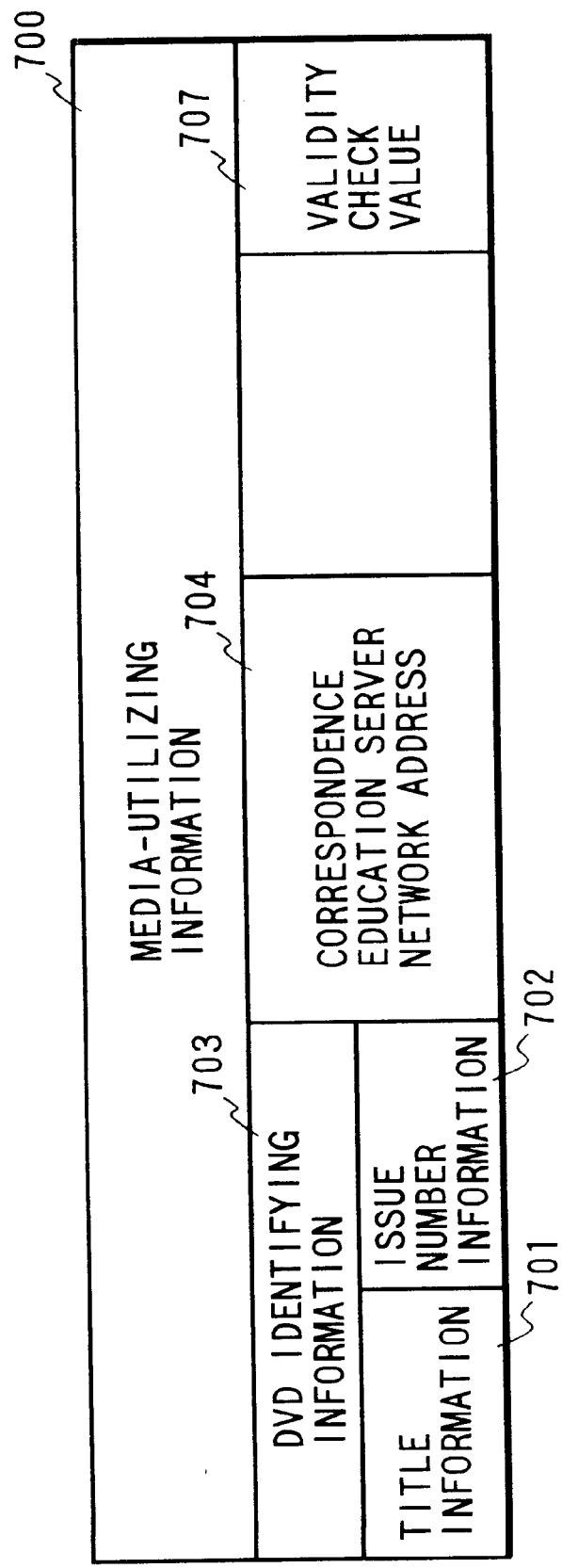
FIG. 7 shows an example of the media-utilizing information in the second embodiment of the invention.

FIG. 7 shows an example of arrangement of media-utilizing information according to the second embodiment of the present invention. Reference numeral 700 represents a media-utilizing information, 701 represents a title information, which can uniquely specify title, issuer, year of issuance, content, etc. of DVD and corresponds to ISBN number used for books, 702 represents issue number information, which is serial number for each DVD set according to the title information 701, 703 represents DVD identifying information summarizing the title information 701 and the issue number information 702, 704 represents a correspondence education server network address, from which the network address of the correspondence education server 620 can be extracted, and 707 represents means for generating a value to be used for checking validity of DVD prepared by the correspondence education server 620, e.g. a validity check value calculated from a part of the media-utilizing information 700, here from DVD identifying information 703, using uni-directional function. The media-utilizing information is already recorded in the media-utilizing information recording area 601 shown in FIG. 6 at the distribution of DVD.

Figure 8:
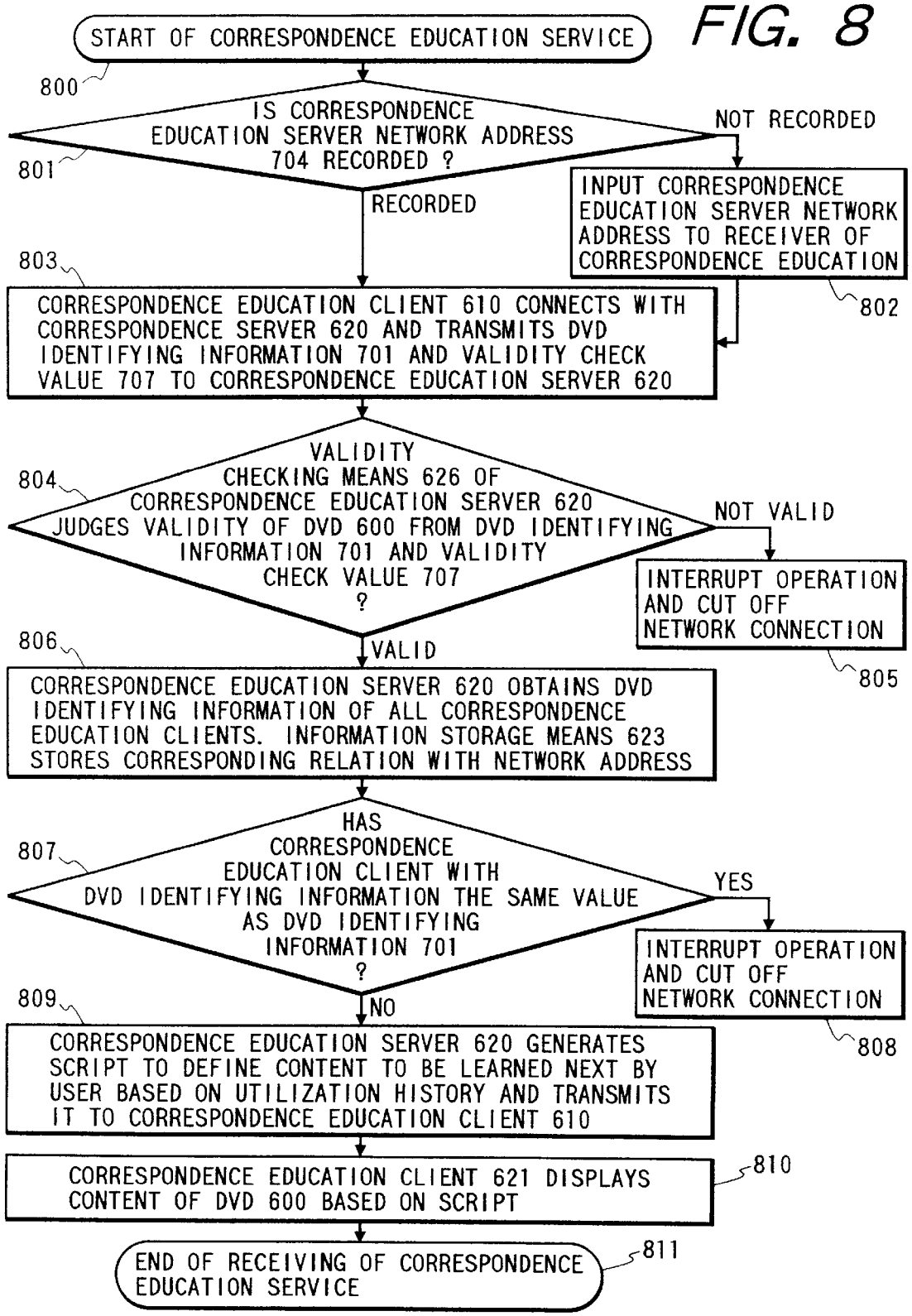
FIG. 8 is a flow chart showing operation of the second embodiment.

FIG. 8 is a flow chart showing a flow of processing in the second embodiment of the present invention.

FIG. 9 shows DVD identification number stored in the correspondence education server 620 and information corresponding to progress as utilization history of the receiver of service course in form of a table, and it is stored in the information storage means 623 of the correspondence education server 620. When the title information is the same, it means the DVDs have the same contents. Even when the title is the same, if issue number is different, it means that DVDs are different from each other. The information showing progress shows how far the education has advanced before semicolon (;) in FIG. 9, and the time after the semicolon shows the time required for the progress.

FIG. 10 shows examples of learning script. The correspondence education server 620 generates the script to DVD, which matches DVD utilization history (title information 4-0123456; issue number information A00000001) shown in the first line of FIG. 9.

Figure 11:
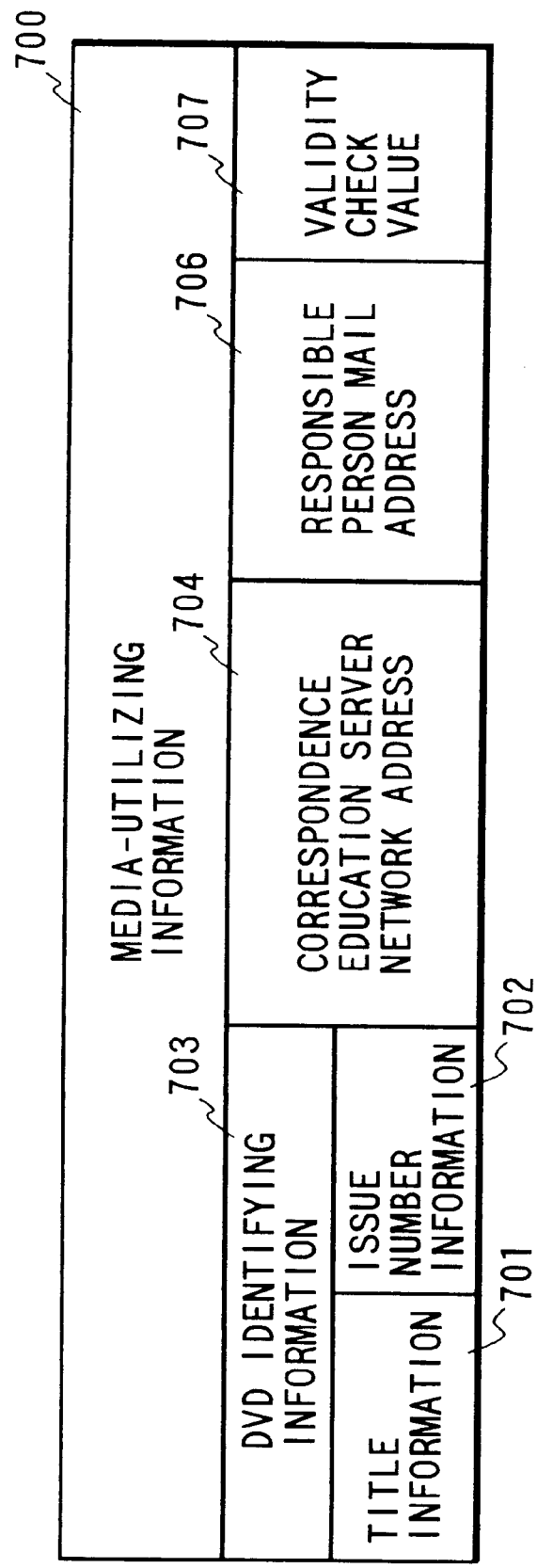
FIG. 11 shows another example of the media-utilizing information in the second embodiment.

FIG. 11 represents an example of arrangement of media-utilizing information in case the first embodiment of the present invention is extended. Reference numeral 706 represents a mail address of a responsible person, which can lead to electronic mail address of a partner, who asks questions regarding to the electronic textbook DVD 600. Reference numerals 700, 701, 702, 703, 704 and 707 are the same as explained in FIG. 7, and detailed description is not given here.

In the following, description will be given on operation of the second embodiment of the present invention referring to FIG. 6 to FIG. 11.

The user displays the electronic textbook DVD 600 bought at bookshop or by mail order sale or distributed from correspondence education service provider using information display means 616 of the correspondence education client 610. In case of the user, who does not yet agree to receive the course of correspondence education service because it is immediately after the purchase of textbook or the user who does not want to receive course of the correspondence education service, the electronic textbook DVD is displayed according to browser, and learning is executed independently. In this case, the content of the electronic textbook DVD 600 is displayed by self-reliant intention of the user similarly to the browser such as electronic book by a conventional type CD-ROM.

Next, for the case of the receiver of correspondence education course who receives the correspondence education service, description will be given referring to the flow chart given in FIG. 8. In FIG. 8, a rectangle with round corners shows start or end of the flow chart, a rhombus indicates judgment, a rectangle represents processing, and an arrow indicates flow of processing.

First, the receiver of correspondence education course sets the electronic textbook DVD 600 on the DVD driving means 613 of the correspondence education client 610 and instructs the central control means 6110 to start the correspondence education using the input means 614. As a result, the receiving of the correspondence education is started as shown in the start 800.

Next, as shown in the judgment 801, the central control means 611 of the correspondence education client 610 judges whether the correspondence education server network address 704 is recorded in the media-utilizing information 700 or not. If it is recorded, it is advanced to Step 803. If not recorded, as shown in Step 802, the network address of the correspondence education server is inputted to the receiver of the correspondence education course via the input means 614, and it is advanced to Step 803.

Next, as shown in Step 803, the central control means 611 of the correspondence education client 610 uses the correspondence education server network address 704 or the network address of the correspondence education server inputted by the receiver of correspondence education and connects with the correspondence education server 620 via the network 630. Then, the DVD identifying information 703 of the electronic textbook DVD 600 and the value of validity check value 707 are transmitted to the correspondence education server 620 using the information transmitting and receiving means 612.

Next, as shown in the judgment 804, the central control means of the correspondence education server 620 receives DVD identifying information 703 and the validity check value 707 using the information transmitting and receiving means 622 and judges whether the electronic textbook DVD 600 is valid or not from DVD identifying information 703 and the validity check value 707 using the validity checking means 626. If it is not valid, it is judged that the electronic textbook DVD 600 has been illegitimately reproduced. Then, as shown in Step 805, the correspondence education server 620 interrupts the operation and disconnects the network connection to the correspondence education client 610. If it is valid, it is advanced to Step 806.

Next, as shown in Step 806, the central control means 621 obtains DVD identifying information obtained from all correspondence education clients except the correspondence education client connected with the correspondence education server 620 at this time. The corresponding relationship between identifying information thus obtained and the network address of the correspondence education client having the identifying information is stored by the information storage means 623.

Next, as shown in the judgment 807, the central control means 621 of the correspondence education server 620 judges whether the correspondence education client having the same DVD identifying information as the DVD identifying information 703 obtained from the correspondence education client 610 is connected or not at this time, i.e. whether two or more different network addresses are present or not to the same DVD identifying information. If it is connected, it is judged that one of the electronic textbook DVDs has been illegitimately reproduced. As shown in Step 808, the correspondence education server 620 stops the operation and disconnects network connection to the correspondence education client 610. If not connected, it is advanced to Step 809.

Next, as shown in Step 809, the central control means of the correspondence education server 620 generates a script for defining display object and display method such as the content to be learned next by the user of the electronic textbook DVD 600 or the point to be emphasized, in particular, the display method such as an appendix to be additionally displayed by the display object display method information generating means 624 based on the correspondence table of DVD identifying information and progress of learning stored in the information storage means 623. Then, using the information transmitting and receiving means 622, the script is transmitted to the correspondence education client 610.

Here, FIG. 9 shows an example of the correspondence table of DVD identifying information and progress of learning. For example, in the progress of learning of a receiver of the correspondence education, who received correspondence education using the electronic textbook DVD, which has "4-0123456" as title information and "A00000001" as issue number information, it means that the receiver has completed the unit 1.3 (2) in 30 minutes.

FIG. 10 is used to explain generation of the script. The data shown as basic data is the data used for generating the script. In this case, basic data is such that, in the progress of learning of a receiver of the correspondence education, who receives correspondence education course using an electronic textbook DVD having "4-0123456" as title information and "A00000001" as issue number information, the receiver has completed the unit 1.3 (2) in 30 minutes. In contrast, the instruction data include the instruction to summarize the unit 1 from the unit 1.3 (3) and from the appendix A, pages 35–39, the instruction to complete the lesson of the day if one hour has elapsed at that time point, and the instruction that the lesson of the day is completed after reading the appendix A, pages 40–45 if one hour has not elapsed. These instructions are generated as a script and are indicated as the instruction data. In this case, the display object display method information generating means 624 considered that the user of the electronic textbook DVD 600 was very quick in the progress of learning in the past and generated such a script.

Next, as shown in Step 810, the central control means 611 of the correspondence education client 610 obtains the script from the correspondence education server 620 using the information transmitting and receiving means 615, stores it by the information storage means 615 and displays the content of the electronic textbook DVD 600 on the information display means 616 based on its content. In this case, the central control means 611 of the correspondence education client 610 controls the DVD driving means 613 based on the script and sends the data to be displayed to the information display means 616.

By this time, as shown in the end 811, receiving of the correspondence education service is completed, and the correspondence education client 610 disconnects the network connection.

As shown in FIG. 11, in case a mail address of a responsible person 706 for receiving questions relating to the electronic textbook DVD is included in a part of the media-utilizing information 700 as the information provider contact information, manual input of address can be eliminated when electronic mail of questions relating to the content of the textbook is transmitted from the correspondence education client utilizing the mail address.

Although it is not described in detail in the present embodiment, in case the correspondence education service carries out examination regularly, it is asked to all of those receiving the correspondence education course to have access to this service on a given day. A key for decoding is distributed to each user via the network. The central control means 611 of the correspondence education client 610 decodes the encoded test questions stored in the electronic textbook DVD 600 using this key. The test questions are displayed by the information display means 616 and may be given to each receiver of the correspondence course. In this case, information relating to the examination time may be transmitted from the correspondence education server 620. When the examination time is over, the display of the test questions by the information display means 616 of the correspondence education client 610 may be forcibly completed, and the data of solution prepared by the correspondence course receiver may be automatically transmitted to the correspondence education server 620.

In FIG. 9, an example of title information, issue number information, and method to describe progress of learning is shown, while learning progress information may be divided to the information indicating the point currently under learning and sum of the time required so far, or other information may be included.

In the present embodiment, description has not been given as to how to apply for the course of the correspondence education service, whereas application may be made via the network or via telephone, facsimile, mail, etc.

In the present embodiment, the network connection is terminated after the completion of the correspondence education course, while communication may be performed only when necessary to reduce communication cost, and communication may be cut off when it is not required, e.g. after receiving of the script.

In the present embodiment, the validity check value calculated using only the media-identifying information is used for the checking of validity of DVD, while the validity check value calculated using media-identifying information and other information may be used.

In the present embodiment, if it is judged that DVD suspected as illegitimately reproduced is used, communication is cut off, while only a warning message may be issued.

In the present embodiment, description has not been given on the case where cumulative learning time in the past is long, i.e. the case of the user whose learning progress is slow. In such case, the content of learning may be thinned or lowered, e.g. without displaying reference materials, or only basic portion is taught, and these may be expressed on the script and taught.

In the present embodiment, description has not been given on the case where the user receives a plurality of courses. In case the user receives a plurality of courses, DVD identifying information 703 may comprise the title information 701 and the issue number information 702, and the electronic textbook DVD may be distributed so that the issue number information 702 will be the same or the correspondence education server 620 may maintain corresponding relationship to indicate that the same user uses a plurality of DVD identifying information 703. When the script is generated, coordination may be performed in such manner that too much time is not assigned to one course only.

In the present embodiment, the correspondence education client 610 is provided with the information display means 6161 having a function to display the electronic textbook DVD 600 and the information transmitting and receiving means 612 having a function to communicate with the correspondence education server 620, while a program having display function and communication function may be stored in the electronic textbook DVD 600 and this may be used by downloading to the correspondence education client 610 when receiving the correspondence education course.

In the present embodiment, the validity checking means 626 is provided in the correspondence education server 620, while it may be provided in the correspondence education client 610 or other computer. In case it is provided in the correspondence education client 610, the result of judgment of the validity checking means of the correspondence education client 610 is sent to the correspondence education server 620. If it is illegitimate, the network connection may be cut off on the correspondence education server 620 side, or instead of sending the result of judgment of the validity checking means to the correspondence education server 620, utilization of the electronic textbook DVD 600 may be automatically and forcibly terminated if the validity checking means judges that the electronic textbook DVD 600 is illegitimate. Or, a program to cut off the network connection on the correspondence education client 610 side is provided, and illegitimate utilization may be prevented by the correspondence education client 610 in case it is considered as illegitimate. In case it is provided in the other computer, DVD identifying information 703 and the validity check value 707 may be transmitted to the other computer having the validity checking means from the correspondence education client 610 using the information transmitting and receiving means 612. The result of the judgment of the validity checking means obtained from DVD identifying information 703 and the validity check value 707 may be transmitted to the correspondence education server 620 or the correspondence education client 610, and the network connection may be cut off at the correspondence education server 620 or at the correspondence education client 610. In case the validity checking means 626 is provided in the correspondence education server 620 or in case it is provided in other than the correspondence education server 620 but the result of judgment is transmitted to the correspondence education server 620, the status of illegitimate reproduction can be identified by the correspondence education server 620.

The uni-directional function used in calculating the validity check value 707 is used only on computers permitted to the correspondence education server 620 or the correspondence education server 620 and it is confidential to all other clients including the correspondence education client 610.

As the validity checking means 626, the following means may be considered, which uses checking function, i.e. a function for validity checking prepared in advance at the correspondence education server 620.

In case the validity checking means 626 is provided on the correspondence education server 620 or on a computer, which is allowed by the correspondence education server 620, if the same function as the uni-directional function to calculate the validity check value 707 as the checking function, DVD identifying information 703 may be used as argument, and the result obtained may be compared with the validity check value 707, and it may be judged whether the two agree with each other or not. On the other hand, in case it is provided on the correspondence education client 610, if the checking function is a function to calculate a certain value based on a plurality of arguments, DVD identifying information 703 and the validity check value 707 may be used as argument, and it may be judged whether the result obtained from it clears the value or the condition determined by the correspondence education server 620 in advance. The checking function used in the latter method is different from the function used in calculating the validity check value 707. The function used in calculating the validity check value 707 cannot be easily obtained from the checking function.

In the present embodiment, DVD is used as the portable medium and media-utilizing information recording area on DVD is used as the recording area of the media-utilizing information, while other media such as floppy disk, CD-ROM, etc. may be used as portable media, and the recording area of the main unit of media may be used as the recording area of the media-utilizing information. As the network, LAN (local area network), WAN (wide area network), Internet, satellite network, etc. may be used.

In the present embodiment, the information display means 616 is defined as the display, by which the correspondence education client 610 executes display, while it is practically not limited to this, and printing by a printer or downloading to an arbitrary storage medium may be performed.

The area division of the media-utilizing information in FIG. 7 and FIG. 11 is logical division, and not physical division.

(Embodiment 3)

Figure 12:
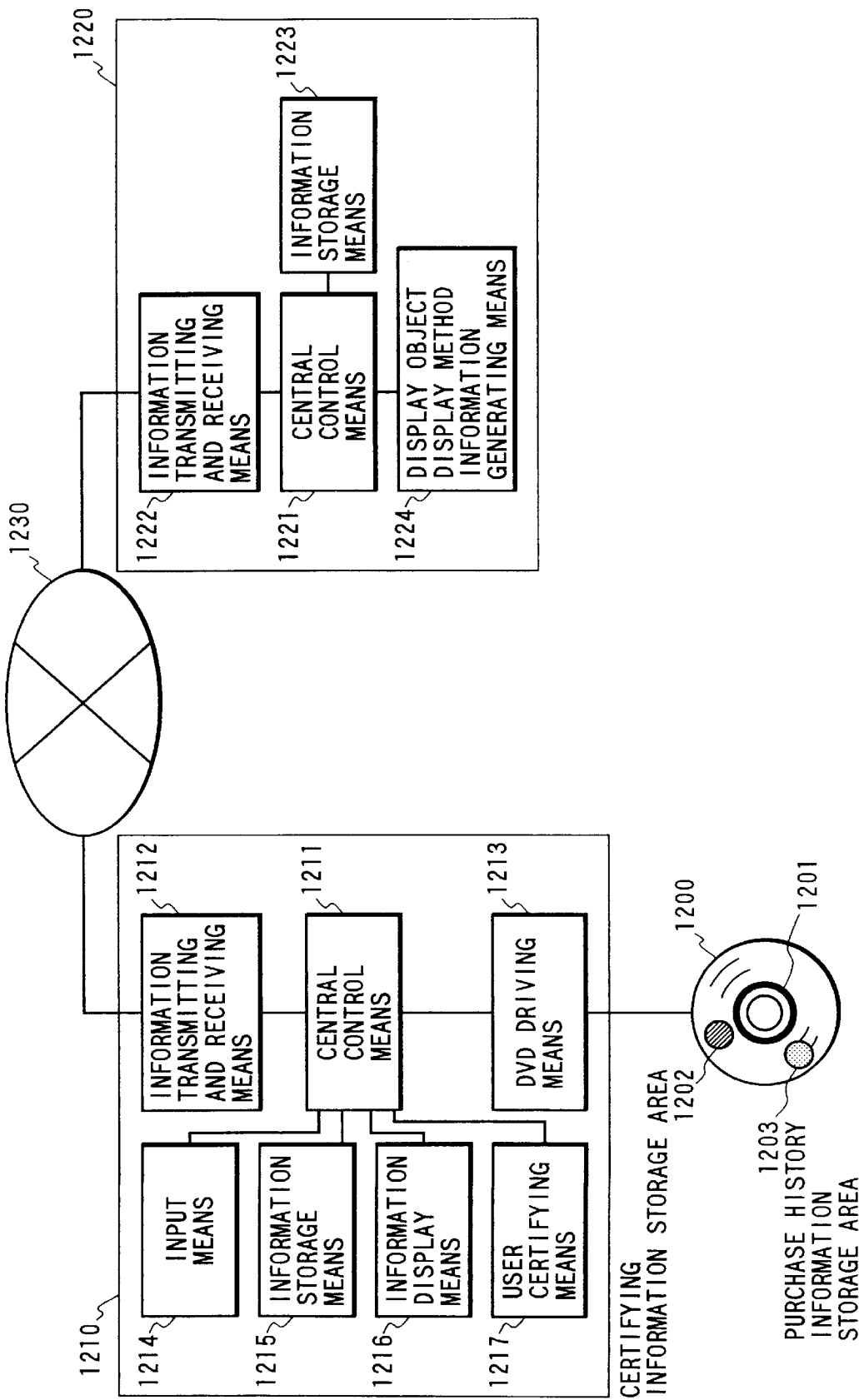
FIG. 12 represents an arrangement of catalog shopping service in a third embodiment of the present invention.

FIG. 12 represents an arrangement of a catalog shopping system using an electronic catalog as the portable medium. Here again, digital video disk (hereinafter referred as "DVD") is used as portable medium, but, unlike the embodiments 1 and 2, it is of rewritable type. The media-utilizing information of the portable medium is recorded on a special-purpose area on DVD, which is different from the original recording area in DVD. This special-purpose area is called "media-utilizing information recording area" hereinafter.

Reference numeral 1200 represents an electronic catalog DVD, which contains data relating to commodity such as specification, external appearance, price, commodity code, etc. of the commodity to be sold, program used for certification of the user, and purchase history information storage area. The certification of the user will be described in detail later. Reference numeral 1201 represents media-utilizing information recording area on DVD, 1202 represents a certifying information storage area where certifying information of users is stored, and 1203 represents a purchase history information storage area where purchase history information of users is stored. Reference numeral 1210 represents a catalog shopping client, which is a computer at hand of a catalog shopping user, 1211 is central control means for controlling overall operation of the catalog shopping client 1210, 1212 is information transmitting and receiving means for transmitting and receiving information relating to the network of the catalog shopping client 1210, 1213 is DVD driving means of the catalog shopping client 1210 for driving the electronic catalog DVD 1200, 1214 represents input means such as keyboard, mouse, voice recognizer, tablet, pen, etc., by which the catalog shopping user inputs to the catalog shopping client 1210, 1215 is information storage means, by which the central control means 1211 of the catalog shopping client 1210 stores necessary information, 1216 is information display means such as display, by which the catalog shopping client 1210 displays to the catalog shopping users, and 1217 is user certifying means for certifying catalog shopping users.

Reference numeral 1220 represents a catalog shopping server for providing catalog shopping service, 1221 is central control means for controlling overall operation of the catalog shopping server 1220, 1222 is information transmitting and receiving means for transmitting and receiving information to the network of the catalog shopping server 1220, 1223 is information storage means for storing necessary information, by which the central control means 1221 of the catalog shopping server 1220 stores information, and 1224 represents display object display method information generating means for generating display object display method information, e.g. script, for defining which of the information recorded in the electronic catalog DVD 1200 should be displayed and how. Reference numeral 1230 represents a network connecting between the catalog shopping client 1210 and the catalog shopping server 1220.

Figure 13:
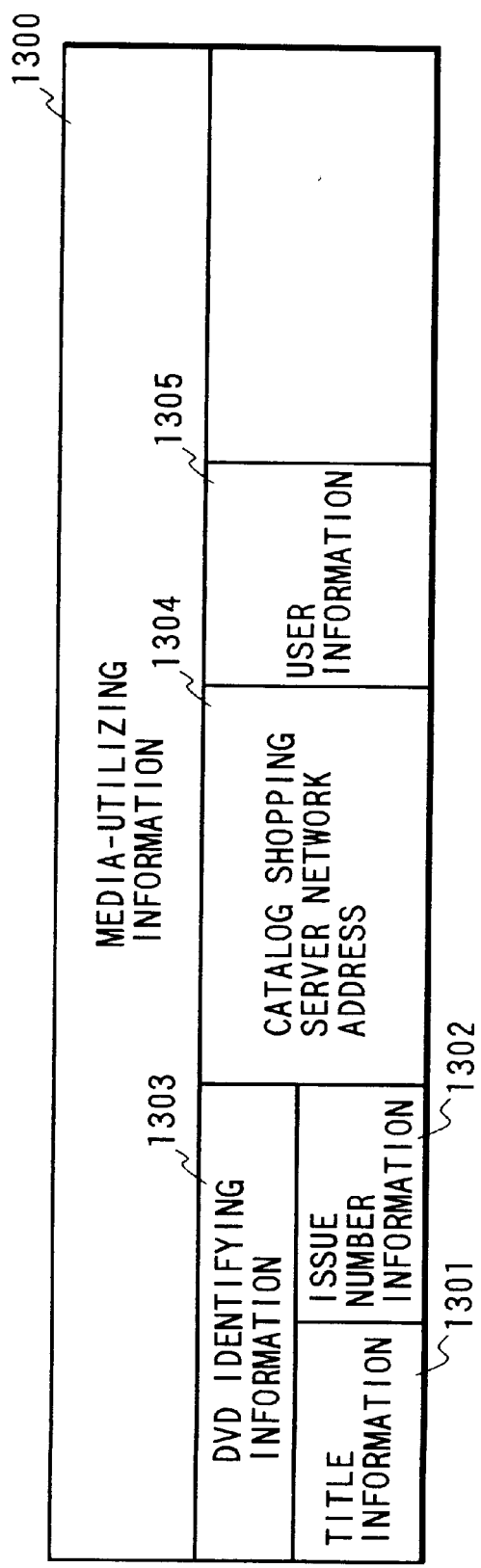
FIG. 13 shows an example of a media-utilizing information in the embodiment.

FIG. 13 shows an example of an arrangement of media-utilizing information according to a third embodiment of the present invention.

Reference numeral 1300 represents a media-utilizing information, 1301 is a title information which can uniquely specify title, issuer, year of issuance, content, etc. of the DVD and corresponds to ISBN number used for books, 1302 is an issue number information, i.e. serial number for each DVD set in accordance with the title information 1301, 1303 is a DVD identifying information summarizing the title information 1301 and the issue number information 1302, 1304 is a catalog shopping server network address, which can extract network address of the catalog shopping server 1220, and 1305 is a user information, which can extract character of each of major users of the electronic catalog DVD 1200. All of the media-utilizing information are already recorded in the media-utilizing information recording area 1201 of FIG. 12 when DVDs are distributed.

Figure 14:
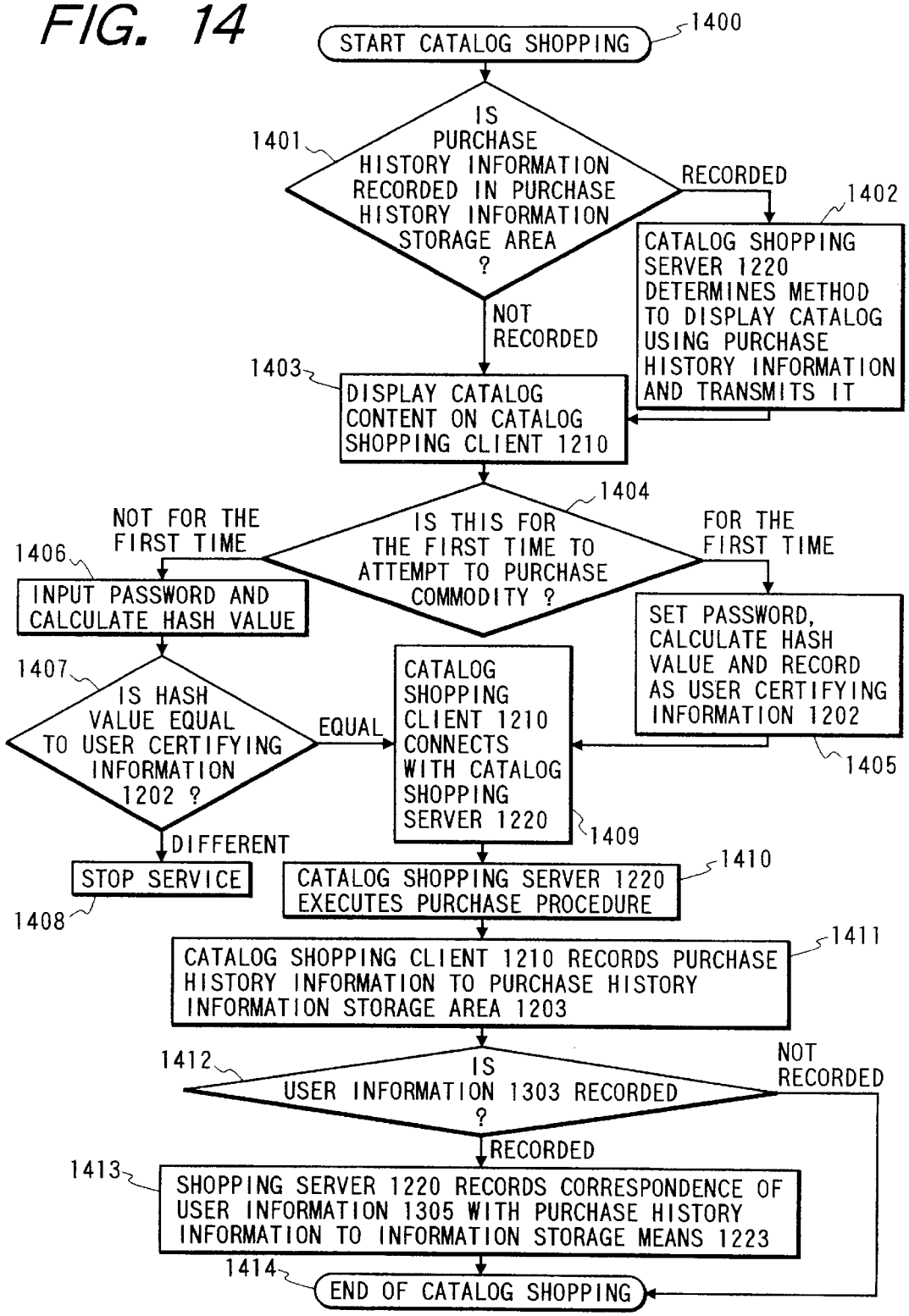
FIG. 14 is a flow chart showing operation of the third embodiment.

FIG. 14 is a flow chart showing a flow of processing of the third embodiment of the present invention.

Figures 15, 16:
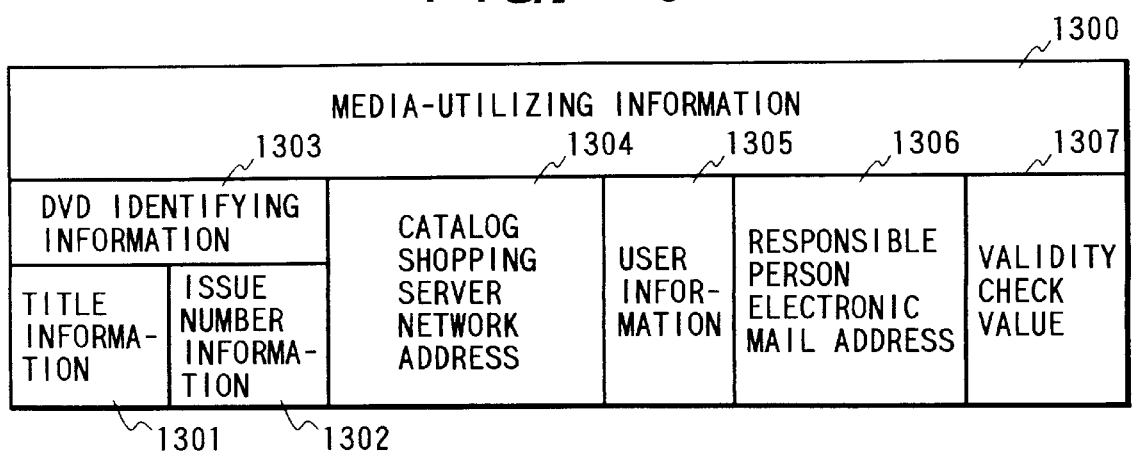
FIG. 15 shows examples of user information in the third embodiment of the invention.
FIG. 16 represents another example of media-utilizing information in the third embodiment.

FIG. 15 represents two examples of the user information 1305 of FIG. 13. For example, in (1), the data such as sex, age, living place, and family members are not known as user information, while sales route of the electronic catalog DVD is direct sale of card service, and the area where the catalogs were sold is Kanto area. In (2), the user information indicates that the user is a woman, 35 years old, and living in southern district of Tokyo, but details of her family members are not known, sales route of the electronic catalog DVD is direct sale from the catalog shopping supplier, and the area where the catalog was sold is Kanto area. The user information 1305 is recorded by means such as code, which can be extracted by DVD driving means 1213 to easily identify character of each of major users.

FIG. 16 shows an example of arrangement of media-utilizing information in case the third embodiment of the present invention is expanded. Reference numeral 1306 represents a responsible person mail address, which can induce electronic mail address of a partner, who inquires about the electronic catalog DVD 1200, and 1307 is a validity check value calculated using the DVD-identifying information 1303. Reference numerals 1300, 1301, 1302, 1303, 1304 and 1305 are the same as explained in FIG. 13, and detailed description is not given here.

In the following, description will be given on operation of the third embodiment of the present invention, referring to FIG. 12 to FIG. 16.

The catalog shopping user obtains the electronic catalog DVD 1200 by purchasing it at a bookshop or by mail order sale or by distribution from a catalog shopping service provider.

Description will be given referring to the flow chart of FIG. 14. In FIG. 14, a rectangle with round corners indicates start or end of the flow chart, a rhombus indicates judgment, a rectangle indicates processing, and an arrow represents flow of processing.

First, the catalog shopping user sets the electronic catalog DVD 1200 to DVD driving means 1213 of the catalog shopping client 1210 and instructs the central control means 1211 to start the catalog shopping using the input means 1214. As shown in the start 1400, the catalog shopping service is started.

Next, as shown in the judgment 1401, the central control means 1211 of the catalog shopping client 1210 judges whether the purchase history information is recorded in the purchase history information storage area 1203 of the electronic catalog DVD 1200 or not. If it is not recorded, there is no need to newly generate a script, and it is decided that a predetermined script is used for display on the electronic catalog DVD 1200, and it is advanced to Step 1403. If it is recorded, as shown in Step 1402, the central control means 1211 of the catalog shopping client 1210 transmits the purchase history information recorded in the purchase history information storage area 1203 together with the DVD identifying information 1303 to the catalog shopping server 1220 using the information transmitting and receiving means 1212. The central control means 1221 of the catalog shopping server 1220 receives the DVD identifying information 1303 and the purchase history information by the information transmitting and receiving means 1222, and determines a script, i.e. display method of the electronic catalog DVD 1200 by the display object display method information generating means 1224. Then, the script is transferred to the catalog shopping client 1210, and it is advanced to Step 1403.

Next, as shown in Step 1403, the central control means 1211 of the catalog shopping client 1210 displays content of the electronic catalog DVD 1200 using the information display means 1216 based on the script determined in Step 1402 or on the predetermined script. Here, the display method of the electronic catalog DVD 1200 may be such that, for example, ranking is put on categories of commodities purchased in the past, and the commodities with high ranking or those related to such commodities may be displayed with emphasis on the catalog, while the commodities, which had attracted no attention, are displayed by text, and not by image display. In this case, the central control means 1211 of the catalog shopping client 1210 controls DVD driving means 1213 based on the script and sends the data to be displayed to the information display means 1216.

In case a commodity which the user wants to purchase is in the display of the electronic catalog DVD 1200, as shown in the judgment 1404, it is judged whether or not this is the first time that the user attempts to purchase the commodity using the electronic catalog DVD 1200. If no certifying information is set in the certifying information storage area 1202 of the electronic catalog DVD 1200, it means that the user attempts to purchase for the first time. If it is set, it means that this is not the first time, i.e. the user had attempted to purchase in the past.

If this is the first time, as shown in Step 1405, the catalog shopping user is asked to set a password using the input means 1214. When the password is set, the central control means of the catalog shopping client 1210 downloads a program for certifying the user in the electronic catalog DVD 1200 to the user certifying means 1217, applies this program to the password set by the user and to DVD identifying information 1303, calculates uni-directional hash value, records the result in the certifying information storage area 1202 of the electronic catalog DVD 1200 as certifying information, and it is advanced to Step 1409.

If this is not the first time, as shown in Step 1406, the catalog shopping user is asked to input a password using the input means 1214, and the central control means 1211 of the catalog shopping client 1210 downloads a program for certifying the user in the electronic catalog DVD 1200 to the user certifying means 1217, applies this program to the password inputted by the user and to the DVD identifying information 1303, and calculates uni-directional hash value. Next, as shown in the judgment 1407, the above hash value is compared with the certifying information already stored in the certifying information storage area 1202 of the electronic catalog DVD 1200 by the user certifying means 1217. If they are equal to each other, it is regarded that the certifying has succeeded, and it is advanced to Step 1409. If not, it is regarded that the certifying failed. Then, as shown in Step 1408, the central control means 1211 of the catalog shopping client 1210 stops the catalog shopping service.

Next, as shown in Step 1409, the central control means 1211 of the catalog shopping client 1210 connects to the catalog shopping server 1220 via the network 1230 using the catalog shopping server network address 1304. In this case, the information relating to the commodity which the catalog shopping user wants to purchase, e.g. commodity code, color, quantity, etc., are transmitted to the catalog shopping server 1220 using the information transmitting and receiving means 1212.

Next, as shown in Step 1410, the central control means 1221 of the catalog shopping server 1220 receives the information relating to the commodity, which the catalog shopping user wants to purchase, using the information transmitting and receiving means 1222 and executes purchase procedure. The purchase procedure may be the same as in the conventional catalog shopping.

Next, as shown in Step 1411, the central control means 1211 of the catalog shopping client 1210 generates purchase history information such as date of purchase, commodity to be purchased, quantity of purchase, etc. based on the information relating to the commodity, for which purchase procedure has been executed, and additionally records it to the purchase history information storage area 1203.

Next, as shown in the judgment 1412, the central control means 1211 of the catalog shopping client 1210 judges whether the data is recorded in the user information 1305 or not. If not recorded, it is advanced to the end 1414. If recorded, the central control means 1211 transmits the user information 1305 to the catalog shopping server 1220 using the information transmitting and receiving means 1212. The central control means 1221 of the catalog shopping server 1220 receives the user information 1305 using the information transmitting and receiving means 1222 and records corresponding relation of the user information 1305 to the commodity to be purchased, quantity to be purchased, etc. in the information storage means 1223. The central control means 1221 can utilize this corresponding relation for statistical processing such as marketing research.

In the user information 1305, the information as shown in FIG. 15 is recorded. As shown by (1) in FIG. 15, the information such as sex or age cannot be recorded unless the catalog shopping service provider directly records it on the electronic catalog DVD 1200. Accordingly, only the information relating to catalog sales route or sales area can be obtained. However, once a commodity has been purchased using the catalog, among the DVD identifying information 1303 of the catalog, the issue number information 1302 can be used as an information specifying the user as in the case of a membership number in the catalog shopping. In general, the catalog is distributed once annually or once in each season. To the user, from whom the order has been received once, a catalog having the same issue number information is directly sent in the second time and after, and the information is obtained from the catalog shopping user at the time of ordering. By recording the information relating to the user thus obtained to the media-utilizing information recording area of DVD as the user information, it is possible to record the data such as sex, age, living place, etc. as shown in FIG. 15 (2) in advance.

After the above processing has been completed, it is advanced to the end 1414, and the catalog shopping client 1210 cuts off the network connection with the catalog shopping server 1220, and the catalog shopping service is terminated.

FIG. 14 is a flow chart showing a basic flow, and it does not show the case where the user wants to purchase a plurality of types of commodities or the case where, after purchase procedure of the commodity has been completed, the content of the electronic catalog DVD is displayed and the user wants to see the explanation on another commodity, while it is possible to execute such processing.

Also, as shown in FIG. 16, the responsible person mail address 1306 receiving inquiry on the electronic catalog DVD is included in a part of the media-utilizing information 1300 as the information provider contact information, and this can be utilized when electronic mail such as inquiry on the content of the catalog from the catalog shopping client is transmitted to eliminate the procedure to input the electronic mail address.

Also, as shown in FIG. 16, by providing the validity check value 1307 in a part of the media-utilizing information 1300, it is possible to judge illegitimate reproduction of the electronic catalog DVD 1200 as in the second embodiment of the present invention.

No special description has been given on the method to start service utilization in the present embodiment, whereas application may be made via the network or via telephone, facsimile, mail, etc. In this case, number of credit card is given to the catalog shopping service provider in advance and correspondence with the issue number information 1302 of the electronic catalog DVD 1200 is stored in the catalog shopping server so that commodity may be purchased by credit without inputting credit card number. Further, in case the electronic catalog DVD 1200 has been purchased by credit card, the correspondence of the credit card number with the issue number information 1302 can be stored on the catalog shopping server 1220 in advance.

In the present embodiment, the purchase history information is recorded by providing the purchase history information storage area 1203 in the rewritable area of the electronic catalog DVD 1200, whereas it is possible to record the purchase history in the purchase history information storage area of the new electronic catalog DVD and to distribute it to the user as in the case where the user information 1305 is recorded on the media-utilizing information recording area 1201 in advance by storing at the same time the relation between the DVD identifying information 1303 of the electronic catalog DVD and the purchase history to the information storage means 1223 also on the catalog shopping server 1220 side.

In the present embodiment, the display object display method information generating means 1224 is provided in the catalog shopping server 1220, while it is possible to provide a program for generating a script in the electronic catalog DVD 1200 and to generate the script by downloading to the catalog shopping client 1210 so that the script can be obtained without passing through the network. Further, if the purchase history information is transferred to the catalog shopping server 1220 in this case, and in case the catalog shopping server 1220 wants to transfer the script, which cannot be generated by the script generating program provided in the electronic catalog DVD 1200, the script may be exceptionally generated at the catalog shopping server 1220 and can be transferred to the catalog shopping client 1210.

In the present embodiment, only one major user is registered, while a plurality of users may be registered so that family members of the user can use the same electronic catalog DVD. In this case, a plurality of certifying information or purchase history information should be registered.

In the present embodiment, the electronic catalog DVD 1200 of rewritable type is used. In case read-only type is used, certifying processing must be performed via the network 1230 between the catalog shopping client 1210 and the catalog shopping server 1220 to certify the user. This can be achieved by the use of technique such as exchange of data for certifying or encoding of protocol on network commonly used in the past, e.g. the use of log-in name and its password often used in the procedure of remote log-in.

In the present embodiment, the user certifying means 1217 is provided in the catalog shopping client 1210. Because this is the means to prevent illegitimate use of the electronic catalog DVD 1200 by a user not certified, this may be provided on the catalog shopping server 1220. This can be achieved by the technique such as exchange of data for certifying or encoding of protocol on the network as described above, e.g. the use of log-in name and its password often used in the procedure of remote log-in.

In the present embodiment, description has been given only on the case where the password is set for the first time, and not on the case where the password is changed. In case the password is already set, illegitimate change can be prevented by providing restriction that the password can be changed only when user certifying processing has succeeded.

In the present embodiment, the password is set without certifying the user in case the user attempts to purchase the commodity for the first time. If it is for the first time, initial password is put to DVD package, and user certification may be performed using this and the password may be inputted newly.

In the present embodiment, timing to input the password, i.e. timing to execute utilization certifying of the user, is set when the user attempts to purchase the commodity. This is set for the purpose to prevent illegitimate commodity purchase. This may be carried out when the electronic catolog DVD 1200 itself is started or when the information other than the commodity purchase is utilized, depending upon the purpose.

In the present embodiment, user certifying is carried out only once, while it is not limited to one time, and it may be executed by a plurality of times in various combinations of the cases, i.e. the case where the electronic catalog DVD 1200 itself is started, the case where the user attempts to purchase commodity, the case the other information is utilized, etc. If a plurality of cases are set, the user who purchases the electronic catalog DVD 1200 can attempt to purchase commodities by inputting the password set by the user, and the user who has purchased and has become a member by paying annual membership fee can attempt to purchase special type of commodity limited in quantity.

In the present embodiment, the catalog shopping client 1210 comprises the information display means 1216 having function to display the electronic catalog DVD 1200 and the information transmitting and receiving means 1212 having function to communicate with the catalog shopping server 1220, while, a program having display function and communication function may be stored in the electronic catalog DVD 1200 and it may be used by downloading to the catalog shopping client 1210 when the catalog shopping service is started.

In the present embodiment, DVD is used as the portable medium and media-utilizing information recording area on DVD is used as the recording area for the media-utilizing information, while other media such as floppy disk, CD-ROM, etc. or read-only type DVD may be used as the portable media, and the media main component recording area may be used as the recording area of media-utilizing information, or media-utilizing information recording area may be used in case of read-only type DVD. As the network, LAN (local area network), WAN (wide area network), Internet, satellite network, etc. may be used.

In the present embodiment, the information display means 1216 is defined as display, by which the catalog shopping client 1210 displays information. In practice, it is not limited to this, and the information may be printed by a printer or may be downloaded to any storage medium as desired.

In FIG. 13 and FIG. 16, area division of the media-utilizing information is logical division, and not physical division.

(Embodiment 4)

Figure 17:
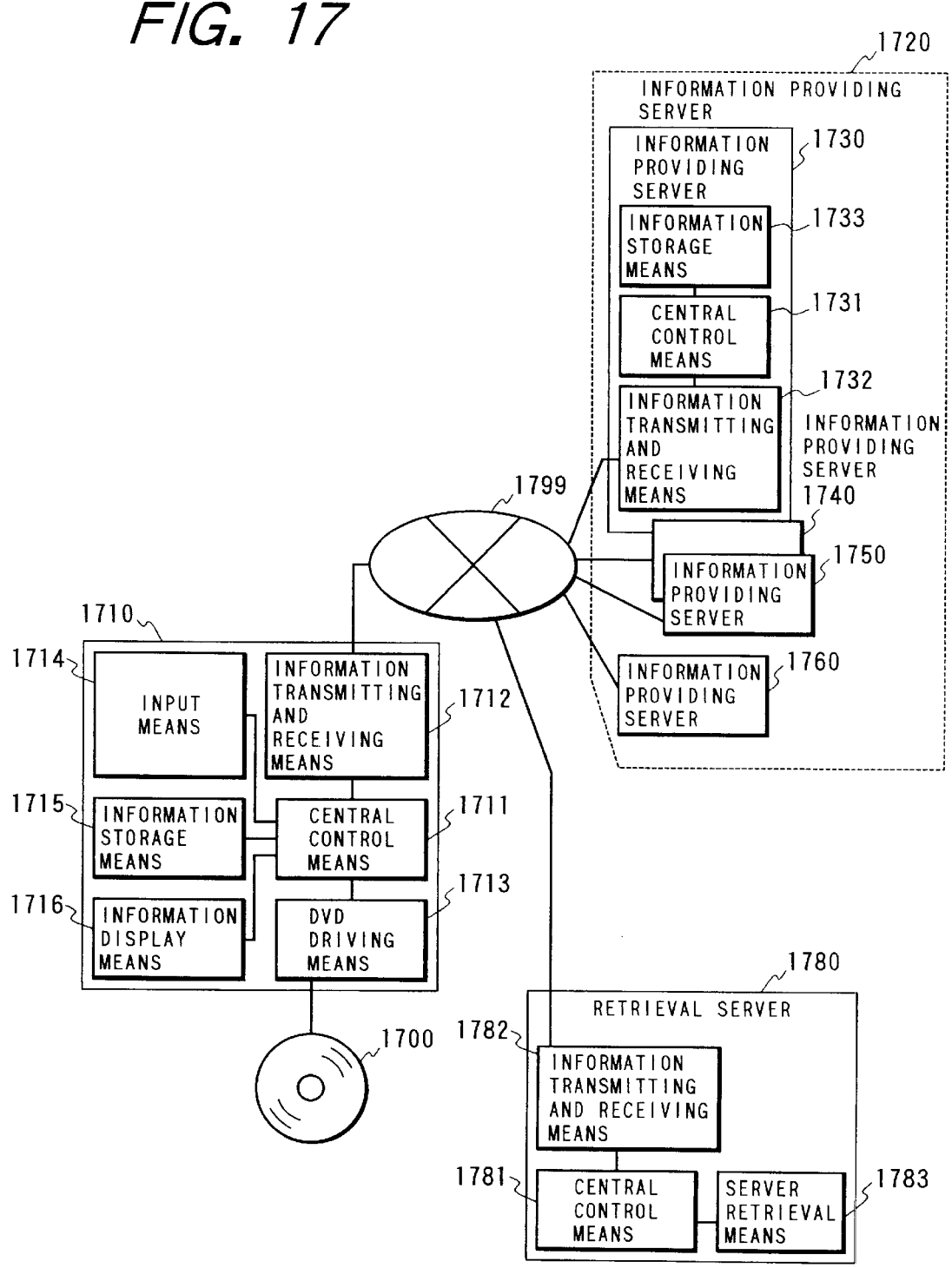
FIG. 17 shows an arrangement of information retrieval service in a fourth embodiment of the invention.

FIG. 17 shows an arrangement of an information retrieval system according to a fourth embodiment of the present invention, in which an electronic cooking book recording the procedure of cooking is explained by moving pictures. Here again, digital video disk (hereinafter referred to as "DVD") is used as portable medium, and it is of read-only type as in the first and the second embodiments. The media-utilizing information of the portable medium is recorded on a special-purpose area on DVD different from original recording area in DVD. This special-purpose area is called media-utilizing information recording area hereinafter.

Reference numeral 1700 represents an electronic cooking book DVD where moving pictures indicating cooking procedure are recorded. To the moving pictures, keywords for information retrieval as explained later in connection with FIG. 19 are added. Reference numeral 1710 is an information retrieval client, which is a computer at hand of the information retriever, 1711 is central control means for controlling overall operation of the information retrieval client 1710, 1712 is information transmitting and receiving means for transmitting and receiving information to the network of the information retrieval client 1710, 1713 is DVD driving means of the information retrieval client 1710 for driving the electronic cooking book DVD 1700, 1714 is input means such as keyboard, mouse, voice recognizer, tablet, pen, etc., by which the information retriever inputs to the information retrieval client 1710, 1715 is information storage means, by which the central control means 1711 of the information retrieval client 1710 stores necessary information, and 1716 is information display means such as display, by which the information retrieval client 1710 displays to the information retriever. Reference numeral 1720 represents information providing server group, which means a plurality of information providing servers who provide information. Reference numerals 1730, 1740, 1750 and 1760 each represents an individual information providing server included in the information providing server group 1720. Reference numeral 1731 represents central control means for controlling overall operation of the information providing server 1730, 1732 is information transmitting and receiving means for transmitting and receiving information to and from the network of the information providing server 1730, and 1733 is information storage means, by which the central control means 1731 of the information providing server 1730 stores necessary information. There are also central control means, information transmitting and receiving means, and information storage means in each of the information providing servers 1740, 1750, and 1760 similarly to those of the information providing server 1730, but detailed description is not given here. Reference numeral 1780 represents a retrieval server, retrieving the information providing server for providing information, which the information retriever seeks from the information providing server group 1720. Reference numeral 1781 represents central control means for controlling overall operation of the retrieval server 1780, 1782 is information transmitting and receiving means for transmitting and receiving information to and from the network of the retrieval server 1780, and 1783 is server retrieval means for retrieving an information providing server from the information providing server group 1720 based on the instruction of the central control means 1781 of the retrieval server 1780. Reference numeral 1799 is a network to connect between the information retrieval client 1710 with a plurality of information providing servers included in the information providing server group 1720 and the retrieval server 1780.

In the present embodiment, only four information providing servers are included in the information providing server group 1720. These servers are limited to four only to facilitate the explanation, and more information providing servers are included in practice.

Figure 18:
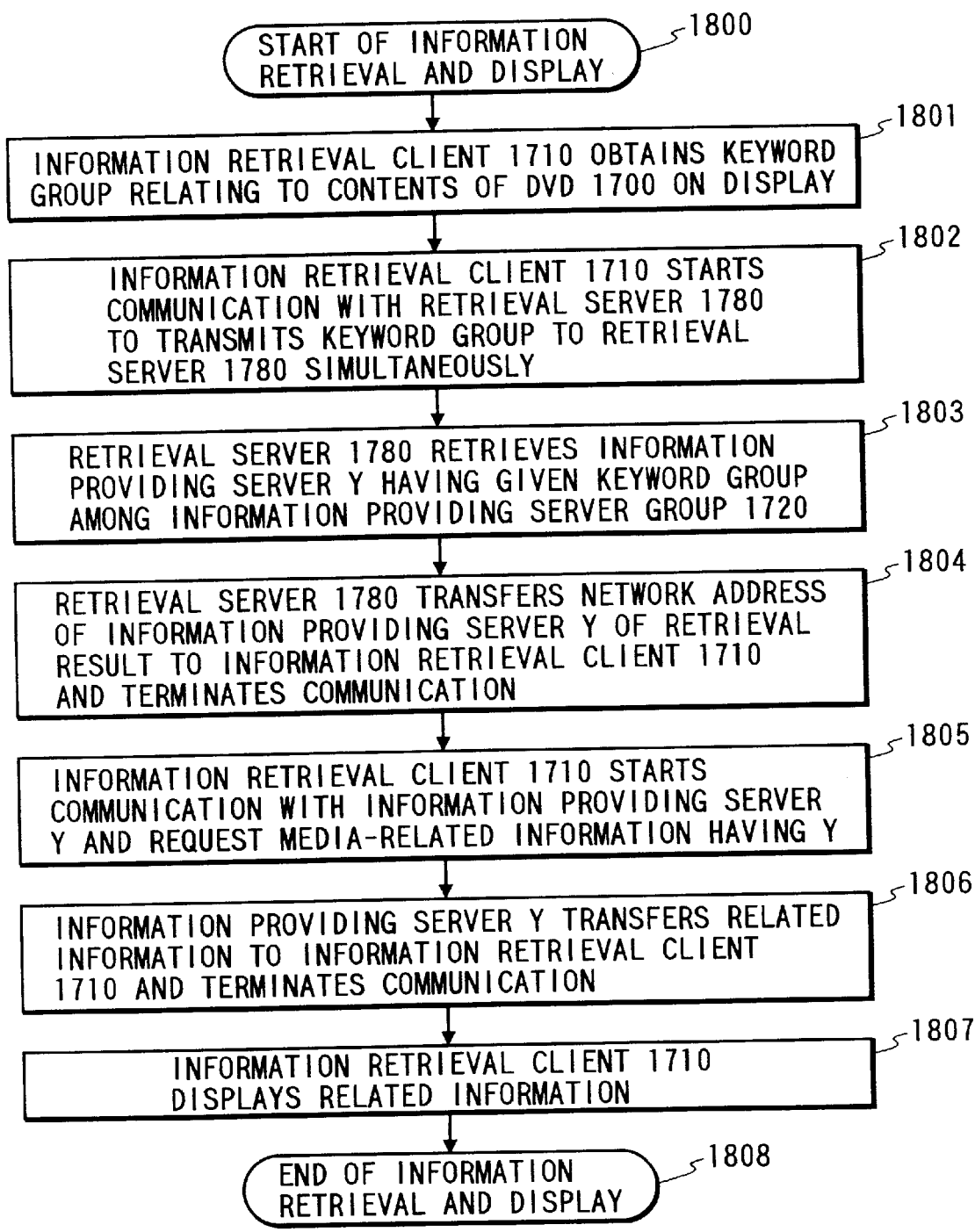
FIG. 18 is a flow chart showing operation of the fourth embodiment.

FIG. 18 represents a flow chart showing a flow of processing in the fourth embodiment of the present invention.

FIG. 19 is an example of data structure in case keywords for retrieval are added to moving pictures. For each of the moving picture data recorded on DVD, starting position and ending position of frame number and correspondence to the keywords relating to image are shown. For example, for a moving picture, which has data name of A00001.mpg, keywords such as "onion", "carrot", and "oxtail" are put between frame number 0000 and frame number 1500, and keywords such as "lettuce", "bean curd", "wakame seaweed", and "sesame" are put between frame number 1501 and frame number 2000 of the same moving picture.

In the following, description will be given on operation of the fourth embodiment of the present invention referring to FIG. 17 to FIG. 19.

The information retriever obtains the electronic cooking book DVD 1700 by purchasing it at a bookshop or by mail order sale.

Description is now given in accordance with the flow chart of FIG. 18. In FIG. 18, a rectangle with round corners indicates start or end of the flow chart in FIG. 18, a rhombus indicates judgment, a rectangle indicates processing and an arrow indicates flow of processing.

First, the information retriever sets the electronic cooking book DVD 1700 to DVD driving means 1713 of the information retrieval client 1710 and instructs the central control means 1711 to start display of the electronic cooking book DVD 1700 using the input means 1714. The central control means 1711 controls the DVD driving means 1713 and displays content of the electronic cooking book DVD 1700 by the information display means 1716. When the information retriever instructs information retrieval relating to the content while the content is being displayed, processing of information retrieval and display is started as shown in the start 1800. Here, the information to be retrieved is the information relating to image on display, in this case, the information of supermarket or private shop where foodstuffs required for cooking are sold.

Next, as shown in Step 1801, the central control means 1711 of the information retrieval client 1710 obtains keyword group relating to the content of the electronic cooking book DVD 1700 on display using DVD driving means 1713. Then, the information retriever inputs network address of the retrieval server 1780 using the input means 1714 and it is advanced to Step 1802. Or, the system is designed in such manner that, when the electronic cooking book DVD 1700 is set to DVD driving means 1713, it is connected to the retrieval server 1780, and it is advanced to Step 1802 without inputting network address by the information retriever.

Next, as shown in Step 1802, the central control means 1711 of the information retrieval client 1710 connects with the retrieval server 1780 via the network 1799. In this case, the keyword group added to the image displayed by the information display means 1716 is transmitted to the retrieval server 1780 using the information transmitting and receiving means 1712, and the central control means 1781 of the retrieval server 1780 receives the keyword group using the information transmitting and receiving means 1782, and it is advanced to Step 1803.

Next, as shown in Step 1803, the central control means 1781 of the retrieval server 1780 retrieves the information providing server having the information, which the information retriever seeks, among the information providing server group 1720 using the server retrieval means 1783 based on the keyword group. Here, if it is supposed that instruction to retrieve media-related information is given from the user while the frame 1000 of moving picture data A00001.mpg in FIG. 19 is being displayed, three keywords of "onion", "carrot", and "oxtail" are used. The server retrieval means 1783 of the retrieval server 1780 retrieves the information providing server having these three keywords. If the information providing server 1730 has all of these keywords, the result of retrieval is the information providing server 1730. In this case, an index of information which the information providing servers have may be stored in the server retrieval means 1783 or the retrieval keyword may be transmitted to each information providing server for retrieval.

Next, as shown in Step 1804, the central control means 1781 of the retrieval server 1780 transmits network address of the information providing server 1730 to the information retrieval client 1710 using the information transmitting and receiving means 1782. The central control means 1711 of the information retrieval client 1710 receives the network address of the information providing server 1730 using the information transmitting and receiving means 1712, and network connection is terminated.

Next, as shown in Step 1805, the central control means 1711 of the information retrieval client 1710 connects with the information providing server 1730 based on the network address of the information providing server 1730 obtained, and requests that the media-related information should be provided.

Next, as shown in Step 1806, the central control means 1731 of the information providing server 1730 transmits content of the media-related information stored by the information storage means 1733 to the information retrieval client 1710 using the information transmitting and receiving means 1732. The central control means 1711 of the information retrieval client 1710 receives the media-related information using the information transmitting and receiving means 1712. Then, the network connection is cut off, and communication is terminated.

Next, as shown in Step 1807, the central control means 1711 of the information retrieval client 1710 displays the obtained media-related information by the information display means 1716. In this case, the media-related information may be temporarily stored by the information storage means 1715 of the information retrieval client 1710.

After the above processing has been completed, it is advanced to the end 1808, and information retrieval and display processing is completed. The network connection may be cut off after the media-related information is received and displayed. It is also probable that the communication may be continued without terminating, depending on the intention of the information retriever.

In the present embodiment, it is described that keywords are added to the moving picture data, while it is not limited to the moving picture, and the same effect can be obtained in case keywords are added to other data such as still picture, test, graphics, etc. so far as the data is in the electronic cooking book DVD 1700 and can be displayed by the information retriever.

In the present embodiment, DVD is used as the portable medium, while other media such as floppy disk, CD-ROM, etc. or read-only type DVD may be used as the portable media. As the network, LAN (local area network), WAN (wide area network), Internet, satellite network, etc. may be used.

In the present embodiment, the information display means 1716 is defined as the display, by which the information retrieval client 1710 performs display, while it is not limited to this, and information may be printed by a printer or may be downloaded to any storage medium as desired.

(Embodiment 5)

Figure 20:
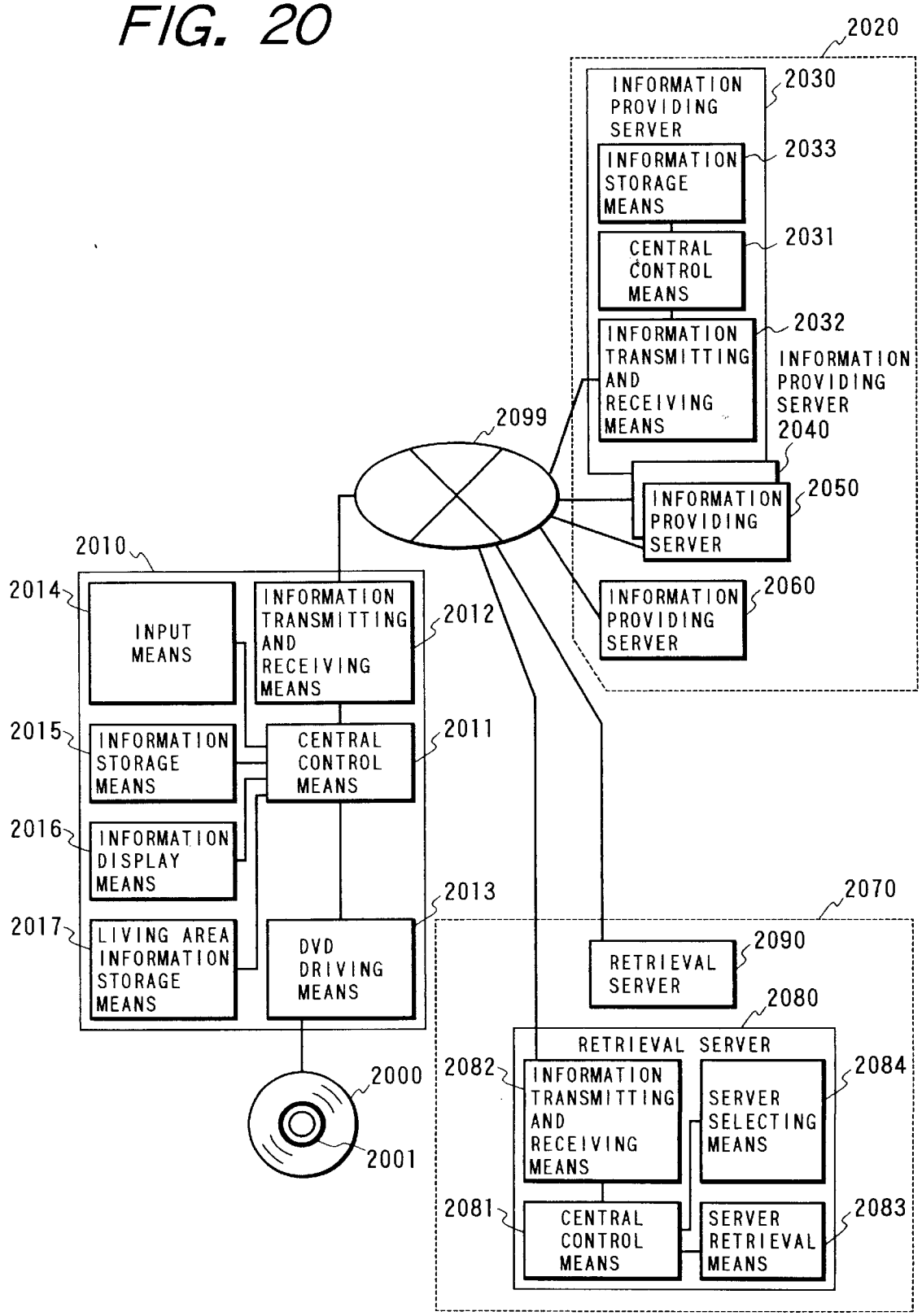
FIG. 20 represents an arrangement of information retrieval service in a fifth embodiment of the invention.

FIG. 20 shows an arrangement of an information retrieval system using an electronic cooking book as the portable medium where cooking procedure is explained by moving pictures. Here again, digital video disk (hereinafter referred as "DVD") is used as the portable medium, and read-only type is used as in the first, the second and the fourth embodiments. Media-utilizing information of the portable medium is recorded on a special-purpose area on DVD different from the original recording area in DVD. This special-purpose area is called media-utilizing information recording area hereinafter.

Reference numeral 2000 represents an electronic cooking book DVD where moving pictures showing cooking procedure are recorded. To the moving pictures, keywords for information retrieval as described later in connection with FIG. 23 are added. Reference numeral 2001 indicates media-utilizing information recording area on the electronic cooking book DVD 2000. Reference numeral 2010 indicates an information retrieval client, which is a computer at hand of the information retriever, 2011 is central control means for controlling overall operation of the information retrieval client 2010, 2012 is information transmitting and receiving means for transmitting and receiving to and from the network of the information retrieval client 2010, 2013 is DVD driving means of the information retrieval client 2010 for driving the electronic cooking book DVD 2000, 2014 is input means such as keyboard, mouse, voice recognizer, tablet, pen, etc., by which the information retriever inputs to the information retrieval client 2010, 2015 is information storage means, by which the central control means 2011 of the information retrieval client 2010 stores necessary information, 2016 is information display means, by which the information retrieval client 2010 displays to the information retriever, and 2017 is living area information storage means, by which the central control means 2011 of the information retrieval client 2010 stores information relating to the living area of the information retriever.

Reference numeral 2020 indicates an information providing server group having a plurality of information providing servers who provide information. Reference numerals 2030, 2040, 2050 and 2060 each represents an individual information providing server included in the information providing server group 2020. Reference numeral 2031 represents central control means for controlling overall operation of the information providing server 2030, 2032 is information transmitting and receiving means for transmitting and receiving information to and from the network of the information providing server 2030, and 2033 is information storage means, by which the central control means 2031 of the information providing server 2030 stores necessary information. In each of the information providing servers 2040, 2050 and 2060, there are the central control means, the information transmitting and receiving means and the information storage means similar to those of the information providing server 2030, but detailed description is not given here. Only four information providing servers are included in the information providing server group 2020 in the present embodiment, while the servers are limited to four to facilitate explanation, and more information providing servers are included in practice.

Reference numeral 2070 represents a retrieval server group having a plurality of retrieval servers for retrieving the information providing server, which provides the information sought by the information retriever. Reference numerals 2080 and 2090 each represents an individual retrieval server included in the retrieval server group 2070. Reference numeral 2081 represents central control means for controlling overall operation of the retrieval server 2080, 2082 is information transmitting and receiving means for transmitting and receiving information to and from the network of the retrieval server 2080, 2083 is server retrieval means for retrieving the information providing server among the information providing server group 2020 based on instruction of the central control means 2081 of the retrieval server 20280, 2084 is server selecting means for selecting a retrieval server from the retrieval server group 2070 based on instruction of the central control means 2081 of the retrieval server 2080. In the retrieval server 2090, there are the central control means, information transmitting and receiving means, server retrieval means and server selecting means similar to those of the retrieval server 2080, but detailed description is not given here. In the present embodiment, only two retrieval servers are included in the retrieval server group 2070, while the servers are limited to two to facilitate explanation, and more retrieval servers are included in practice.

In the present embodiment, to facilitate explanation, the information providing servers 2030, 2040 and 2050 are registered in the retrieval server 2080 as objects to be retrieved, and the information providing server 2060 is registered as the object to be retrieved in the retrieval server 2090.

Reference numeral 2099 represents a network, which connects the information retrieval client 2010 with a plurality of information providing servers included in the information providing server group 2020 and with a plurality of retrieval servers included in the retrieval server group 2070.

Figure 21:
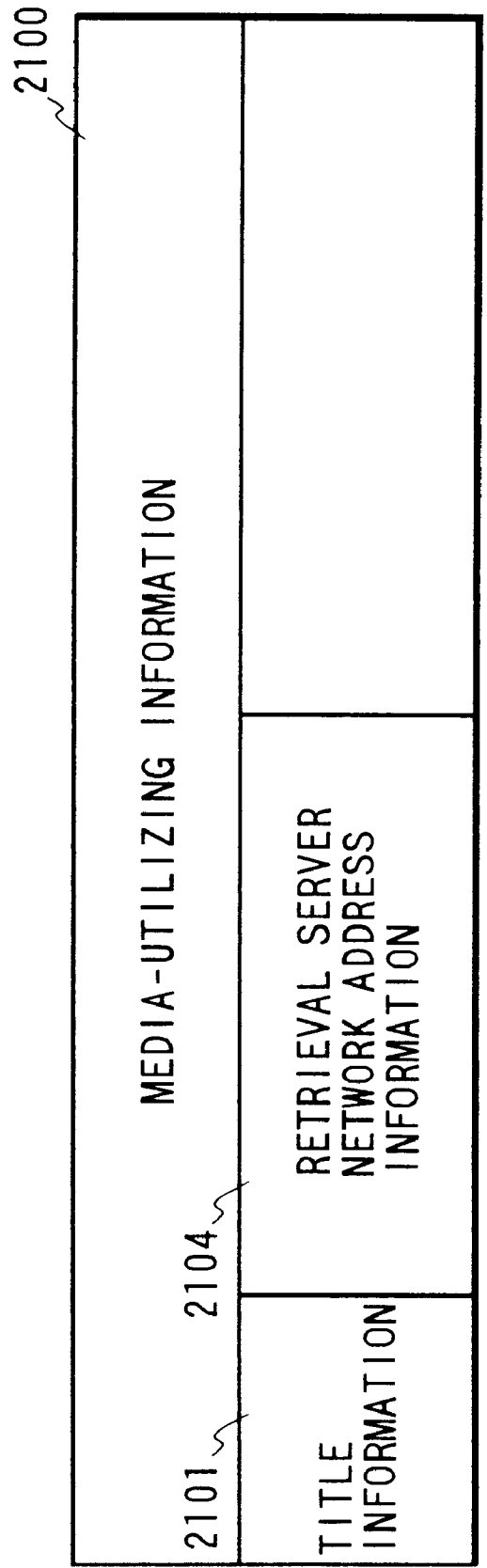
FIG. 21 shows an example of a media-utilizing information in the fifth embodiment of the invention.

FIG. 21 shows an example of an arrangement of media-utilizing information according to the fifth embodiment of the present invention.

Reference numeral 2100 represents media-utilizing information, 2101 is a title information, which can uniquely specify title, issuer, year of issuance, content, etc. of DVD and corresponds to ISBN number used for books, 2104 is retrieval server network address information, which can extract network address of representative retrieval server. All of the media-utilizing information is already recorded in the media-utilizing information recording area 2001 shown in FIG. 20 when DVDs are distributed. Here, representative retrieval server means the retrieval server which has server selecting means. In the present embodiment, it is supposed that network address of the retrieval server 20280 is recorded as the retrieval server network address information 2104 to facilitate explanation.

Figure 22:
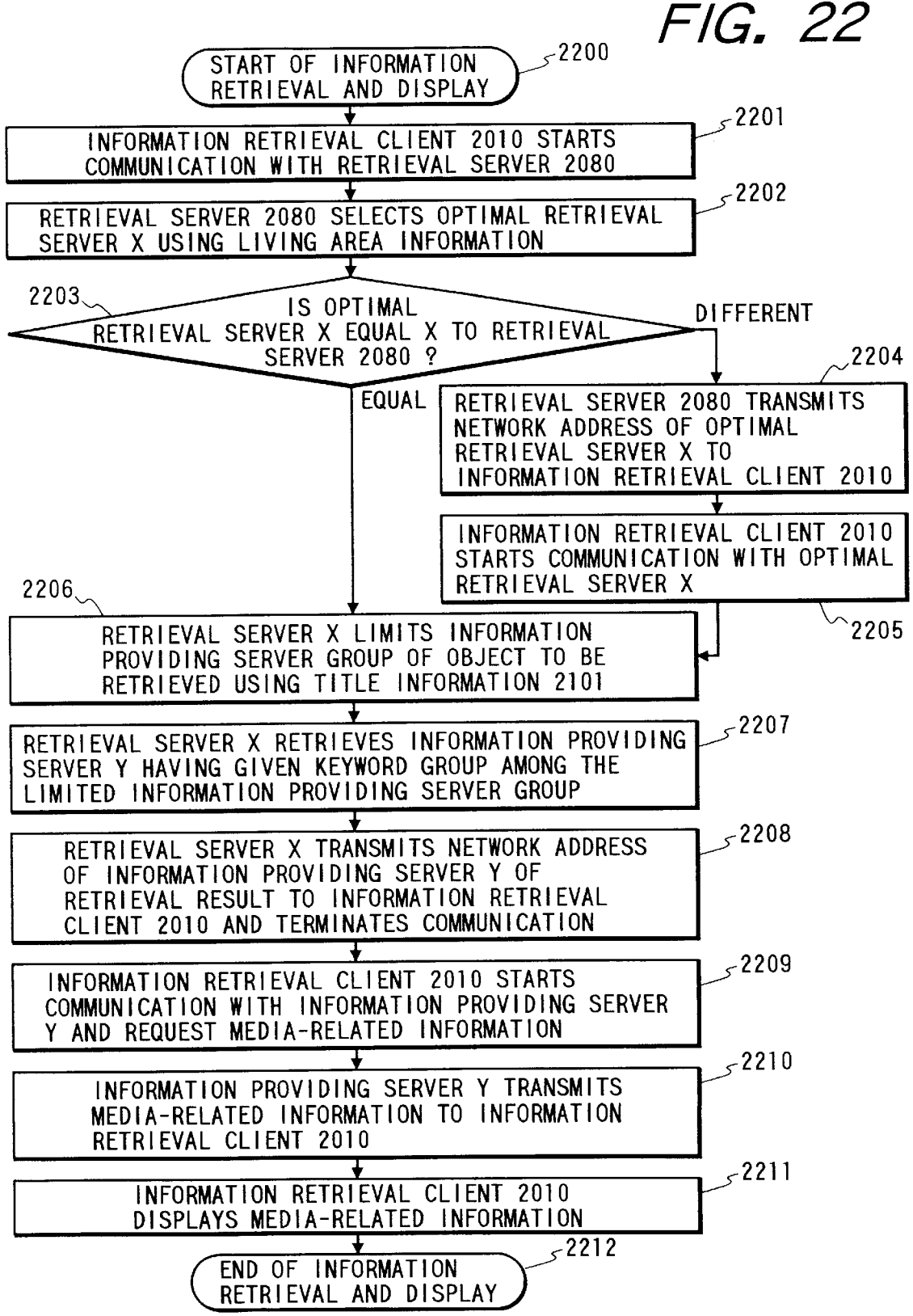
FIG. 22 is a flow chart showing operation of the fifth embodiment.

FIG. 22 is a flow chart showing a flow of processing in the fifth embodiment of the present invention.

FIG. 23 shows an example of data structure in case keywords for retrieval are added to moving pictures. For each of the moving picture data recorded on DVD, starting and ending positions of the frame number and correspondence with the keywords relating to the image are shown. For example, for a moving picture having data name of A00001.mpg, keywords of "onion", "carrot" and "oxtail" are added between frame number 0000 and frame number 1500. For the same moving picture, keywords of "lettuce", "bean curd", "wakame seaweed" and "sesame" are added between frame number 1501 and frame number 2000.

Figure 24:
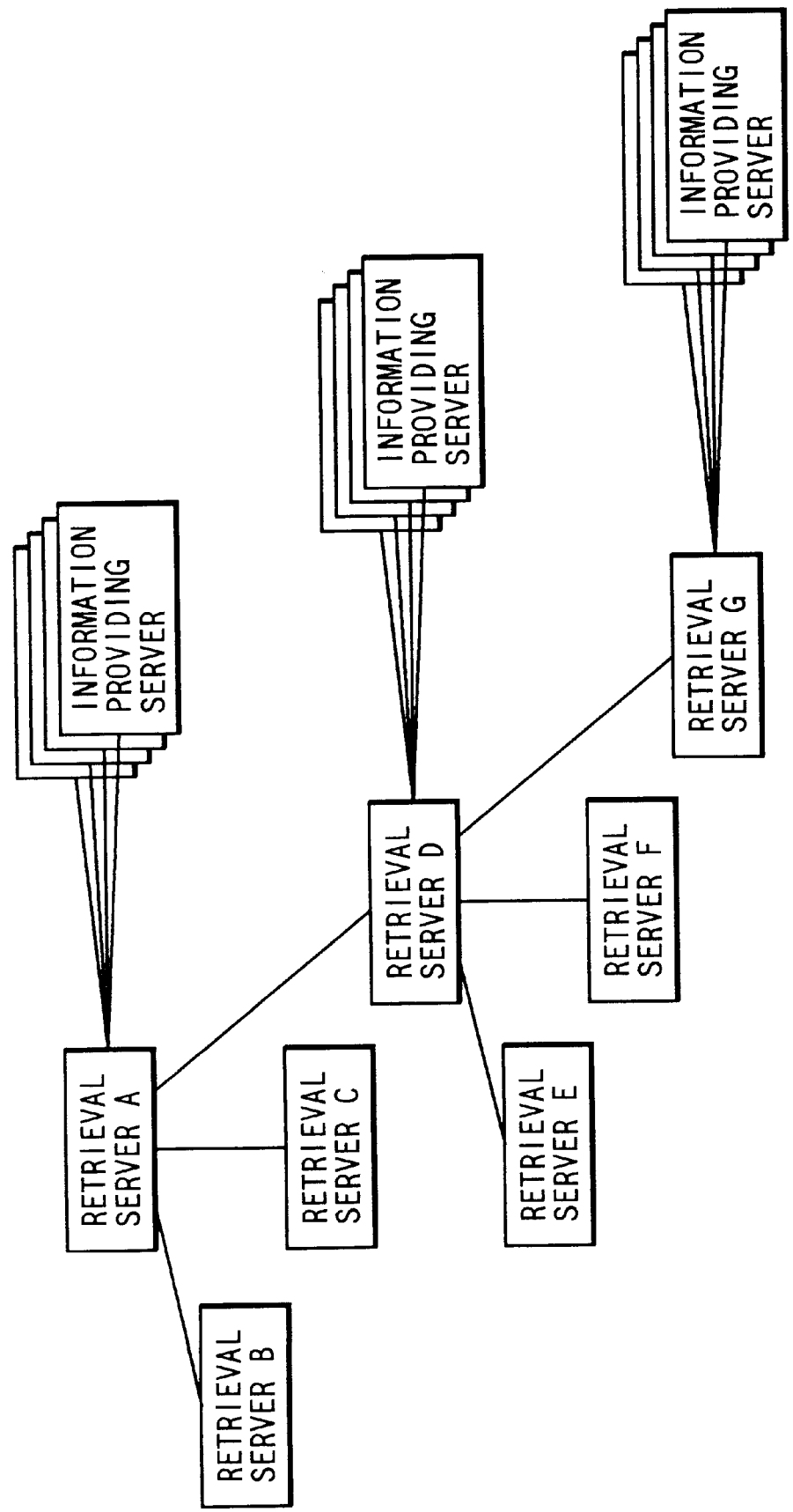
FIG. 24 represents hierarchical structure of a retrieval server in the fifth embodiment.

FIG. 24 shows an example where the retrieval servers form hierarchical structure.

In the following, description will be given on operation of the fifth embodiment of the present invention referring to FIG. 20 to FIG. 24.

The information retriever purchases the electronic cooking book DVD 2000 at a bookshop or by mail order sale.

Description is now given in accordance with the flow chart of FIG. 22. In FIG. 22, a rectangle with round corners indicates start or end of the flow chart, a rhombus indicates judgment, a rectangle indicates processing, and an arrow indicates flow of processing.

First, the information retriever sets the electronic cooking book DVD 2000 to the DVD driving means 2013 of the information retrieval client 2010 and instructs the central control means 2011 to start display of the electronic cooking book DVD 2000 using the input means 2014. The central control means 2011 controls the DVD driving means 2013 and displays content of the electronic cooking book DVD 2000 using the information display means 2016. When the information retriever instructs to retrieve information relating to the content while the content is being displayed, processing of information retrieval and display is started as shown in the start 2200. Here, the information of the object to be retrieved means the information relating to the image on display by the information display means 2016, and in this case, it is the information of supermarket or private shop where foodstuffs required for the cooking are sold.

Next, as shown in Step 2201, the central control means 2011 of the information retrieval client 2010 connects itself to the retrieval server 2080 via the network 2099 using the retrieval server network address information 2104 among the media-utilizing information 2100 recorded in the media-utilizing information recording area 20001 of the electronic cooking book DVD 2000. In this case, the information relating to the living area of the information retriever stored in the living area information storage means 2017 of the information retrieval client 2010, the title information 2101, and the keyword group added to the image on display are used as arguments and are transmitted to the retrieval server 20280 using the information transmitting and receiving means 2012. In the present embodiment, it is supposed that network address of the retrieval server 2080 is recorded in the retrieval server network address information 2104 to facilitate explanation. However, subsequent operation is the same even when network address of the retrieval server having server selecting means is recorded as the other retrieval server.

Next, as shown in Step 2202, the central control means 2081 of the retrieval server 2080 receives the information relating to the living area of the information retriever, the title information 2101 and the keyword groups added to the image on display by the information display means 2016 of the information retrieval client 2010 using the information transmitting and receiving means 2082. From a plurality of retrieval servers included in the retrieval server group 2070, the optimal retrieval server X is selected based on the information relating to the living area using the server selecting means 2084. As the information relating to the living area, name of place such as "Higashi-Shinagawa, Shinagawa-ku, Tokyo" is registered in text. In the retrieval server having the server selecting means, the information of all retrieval servers relating to the present service is registered. When selecting the retrieval server, for example, the retrieval server positioned physically closest to the living area of the information retriever may be selected. Here, the information relating to the living area is used for the selection of the retrieval server because it is considered that the user normally visits private shop or supermarket, which operates information providing server closer to the living area, because these information providing servers are mostly registered as the retrieval servers operated at physically closer places. Naturally, there may be the cases where the information providing servers physically closer to the living area of the information retriever are registered in case of the retrieval server at remote place. Even in such case, the retrieval server is selected by judging based on the information relating to the living area. In the present embodiment, it is supposed that the retrieval server 2080 itself has been selected as X. The information providing servers registered in the retrieval server 2080 include the information providing servers 2030, 2040 and 2050 in the information providing server group 2020, and the information providing server 2060 is not included.

Next, as shown in the judgment 2203, the retrieval server 2080 judges whether the retrieval server X is the retrieval server 2080 itself. If it is different, it is advanced to Step 2204. If it is equal, it is advanced to Step 2206. To facilitate explanation, it is supposed in the present embodiment that the retrieval server X is equal to the retrieval server 2080, and it is advanced to Step 2206. If it is different, the procedure is as follows: If the retrieval server X is different from the retrieval server 2080, as shown in Step 2204, the central control means 2081 of the retrieval server 2080 transmits network address of the retrieval server X to the information retrieval client 2010 using the information transmitting and receiving means 2082. Next, as shown in Step 2205, the central control means 2011 of the information retrieval client 2010 receives the network address of the retrieval server X using the information transmitting and receiving means 2012, cuts off the network connection with the retrieval server 2080, and executes network connection newly to the retrieval server X via the network 2099. In this case, using the keyword group added to the image on display at the title information 2101 and the information display means 2016 as argument, it is sent to the retrieval server X using the information transmitting and receiving means 2012. Such is the operation in the procedure of the case where the retrieval server X is different from the retrieval server 2080.

Next, as shown in Step 2206, the retrieval server X, or the retrieval server 2080 in this case, limits and defines the information providing server to be retrieved from a plurality of information providing servers registered in the retrieval server 2080 based on the title information 2101. To facilitate the explanation, three information providing servers, i.e. information providing servers 2030, 2040 and 2050, are registered in the present embodiment. The retrieval server 2080 further limits the information providing server to be retrieved based on the title information 2101. Specifically, in case the information retrieval service in the present embodiment supports various information providing services, it is not that all of the information providing servers included in the information providing server group 2020 can always provide information relating to the electronic cooking book DVD 2000 on display. Because it is judged that the object to be retrieved is foodstuff information from the title information 2101, it is possible to limit the object to be retrieved only to the information providing servers capable to provide foodstuff information. Here, if it is supposed that the information providing servers 2030 and 2040 are the information providing servers capable to provide foodstuff information, and that the information providing server 2050 is capable to provide road information, the object to be retrieved is limited to the information providing servers 2030 and 2040.

Next, as shown in Step 2207, the central control means of the retrieval server 2080 retrieves the information providing server having the information which the information retriever seeks, using the server retrieval means 2083 based on the keyword group added to the image on display among the arguments delivered from the information retrieval client 2010. Here, if it is supposed that the instruction to retrieve the media-related information is received from the user while the frame 1000 of the moving picture data A00001.mpg in FIG. 23 is being displayed, three keywords of "onion", "carrot" and "oxtail" are used. The server retrieval means 2083 of the retrieval server 2080 retrieves the information providing server having these three keywords. If the information providing server 2030 has all keywords, the result of retrieval is the information providing server 2030.

Next, as shown in Step 2208, the central control means 2081 of the retrieval server 2080 transmits the network address of the information providing server 2030 to the information retrieval client 2010 using the information transmitting and receiving means 2082, and the network connection with the information retrieval client 2010 is terminated.

Next, as shown in Step 2209, the central control means 2011 of the information retrieval client 2010 receives the network address of the information providing server 2030 using the information transmitting and receiving means. The network connection with the information providing server 2030 is automatically started, and it is requested to provide the media-related information.

Next, as shown in Step 2210, the central control means 2031 of the information providing server 2030 transmits content of the media-related information stored in the information storage means 2033 to the information retrieval client 2010 using the information transmitting and receiving means 2032.

Next, as shown in Step 2211, the central control means 2011 of the information retrieval client 2010 receives the media-related information using the information transmitting and receiving means 2012, and its content is displayed on the information display means 2016. In this case, it is naturally possible to temporarily store the media-related information by the information storage means 2015 of the information retrieval client 2010.

After the above processing has been completed, the processing proceeds to the end 2212. The information retrieval client 2010 cuts off the network connection with the information providing server 2030, and information retrieval and display processing is completed. The network connection may be cut off at the time when the media-related information has been received, and the media-related information may be displayed subsequently. It is also possible that communication is continued without terminating it at the intention of the information retriever.

FIG. 22 is a flow chart showing a basic flow and does not represent the processing in case a plurality of information providing servers are retrieved, while it is possible to display related information from a plurality of information providing servers. In this case, there are various methods: a method to display related information from all information providing servers at one time, a method to display them one after another, or a method to display them from the most closely related information.

To facilitate explanation in the present embodiment, it is supposed that the retrieval servers included in the retrieval server group 2070 are all equal to each other, while it is also possible to have hierarchical arrangement, in which the server selecting means for selecting other server based on the information relating to the living area of the information retriever is not owned by all retrieval servers, and only one representative retrieval server or only a representative retrieval server set for each area has such means. FIG. 24 shows an example of the hierarchical arrangement. The retrieval server A at the uppermost level has server selecting means for selecting the optimal retrieval server from three retrieval servers B, C and D based on the information relating to the living area. Further, the retrieval server D has server selecting means for selecting the optimal retrieval server from three retrieval servers E, F and G. At the same time, retrievable information providing server group is also registered in all retrieval servers. In FIG. 24, it is shown that the information providing servers are registered only in three retrieval servers A, D and G. This is because the information providing servers registered in the other retrieval servers are not shown to facilitate explanation.

In the present embodiment, selection of the retrieval servers is performed each time, while it may be arranged in such manner that retrieval is carried out for once and when it is found which of the retrieval servers should be selected, the network address of the retrieval server is stored in the information storage means 2015 of the information retrieval client 2010. In such case, the information retrieval client 2010 gives the title information 2101 and the keyword added to the image on display, not to the retrieval server network address information 2104, but to the retrieval server having the network address stored in the information storage means 2015, and requests information retrieval. In the present embodiment, description has been given on the read-only type DVD. In case the rewritable type is used, the network address of the optimal retrieval server may be recorded on the rewritable area in the electronic cooking book DVD 2000.

Also, a thesaurus may be provided in the retrieval server, and this may be used when retrieving the information providing server. In this case, there may be an adequate thesaurus system for each type of information such as foodstuff information, road information, etc., and the proper thesaurus may be selected using the title information 2101. In selecting the thesaurus, there may be a system depending on the living area besides the type of information, and the proper thesaurus may be selected using the information relating to the living area stored in the living area information storage means 2017.

As the information relating to the living area stored in the living area information storage means 2017, text data showing name of places are given as an example, while telephone number of the home of the information retriever may be utilized.

In the above, it is described that the network address of one retrieval server is recorded in the retrieval server network address information 2104, while it may be arranged in such manner that network addresses of a plurality of retrieval servers are recorded, and the information retrieval client 2010 selects the optimal retrieval server from said plurality of retrieval servers using the information relating to the living area stored in the living area information storage means 2017. In this case again, there is no need to select the retrieval server each time as described above, and it may be arranged in such manner that the network address of the optimal retrieval server may be stored in the information storage means 2015 of the information retrieval client 2010 when the optimal one is found, or, in case of the rewritable DVD, the information may be recorded in the rewritable area in the electronic cooking book DVD 2000.

Also, the information relating to the living area stored in the living area information storage means 2017 is used in the above only in case the retrieval server is selected, while the retrieval server may utilize it again when retrieving the information providing server. This is effective in case one retrieval server is assigned in a relatively wide area to obtain the retrieval result with higher accuracy.

In the above, it is described that keywords are added to the moving picture data, while it is not limited to the moving pictures, and keyword may be added to the other data such as still picture, text, graphics, etc. so far as it is in the electronic cooking book DVD 2000 and can be displayed to the information retriever.

In the above, all relevant keyword groups at the time of instruction of the information retriever are used for retrieval, while the keyword groups may be presented to the information retriever in advance, i.e. before performing retrieval, and accuracy of the retrieval may be raised by indicating the keywords, which need not be retrieved. Further, the keywords not needed always may be registered in the information storage means 2015 of the information retrieval client 2010 in advance, and retrieval may be executed without indicating unnecessary keywords each time. In case the rewritable DVD is used, it is possible to record the keyword requiring no retrieval in the rewritable area in the electronic cooking book DVD 2000.

In the above, the retrieval is started at the timing instructed by the information retriever, while retrieval may be started automatically while the information retriever is displaying the data of moving pictures in the electronic cooking book DVD 2000, and only the number of retrieval results or a part of retrieval results including name of place such as supermarket or private shop where foodstuff is sold may be displayed. If the supermarket or the private shop displayed as a part of the retrieval results is geographically remote, it is meaningless to request the display of the media-related information, and there is no need to display. Such judgment is up to the information retriever, and waste of time and labor due to such meaningless retrieval can be eliminated. In case the retrieval is started automatically, it may be started when a certain time has elapsed after the display of the content of the electronic cooking book DVD 2000 is started, or retrieval may be always automatically performed in case the author of the electronic cooking book DVD 2000 displays recommendable cooking procedure.

In the present embodiment, description has been given on the case where retrieval result returns. In case the retrieval result is 0, the information retrieval client 2010 may automatically mitigate the retrieval condition and may execute the retrieval again so that the result of at least one case returns.

In the above, description has not been given on history control of the retrieval operation. As described in the second and the third embodiments of the present invention, history control may be performed by recording the issue number information to the media-utilizing information and this may be utilized for detection of unnecessary keywords, for restriction of the retrieval condition or for customization of display method of the retrieval results.

In the present embodiment, DVD is used as the portable medium, and media-utilizing information recording area on DVD is used as the recording area for the media-utilizing information, while other media such as floppy disk, CD-ROM, etc. or read-only DVD may be used as portable media, and in case of the recording area of the media main component or read-only type DVD, the media-utilizing information recording area may be used as the recording area of the media-utilizing information. As the network, LAN, (local area network), WAN (wide area network), Internet, satellite network, etc. may be used.

In the present embodiment, the information display means 2016 is defined as the display, by which the information retrieval client 2010 performs display. In practice, however, it is not limited to this, and information may be printed by a printer or may be downloaded to any storage medium as desired.

In FIG. 21, area division of the media-utilizing information is logical division, and not physical division.

As described above, media-utilizing information is provided to each of the portable media, which are prepared in large quantity and distributed, and a part of them is diverted for the use on network application utilization history control of the users. Thus, there is no need to check the user number after the distribution of the media, and this improves the quality of service to each of individual users.

In case there is provided general-purpose retrieval service, the receiver of the service is stored as media-utilizing information. By the use of the keyword relating to the information in the media and the information relating to the living area of the user for the service, the information closely related to daily life can be obtained even when using the portable media, which are for general purpose and distributed in wide area, and there is no need for the user to execute maintenance in relation to new preparation, deletion, change, etc. of the servers for providing information.

Further, check value based on the value generated using a confidential function in the media-utilizing information is recorded, and this can be utilized for detecting illegitimate copying of the media. In case the medium is of rewritable type, illegitimate use of the medium itself by the other party can be detected.

It should be understood that the foregoing relates to only preferred embodiments of the present invention, and that it is intended to cover all changes and modifications of the embodiments of the invention herein used for the purpose of the disclosure, which do not constitute departures from the spirit and scope of the invention.

What is claimed is:

1. A system for connecting portable media with a network, at least comprising:
    portable media each having prerecorded media-utilizing information specific to each;
    a first computer provided with media driving means for driving said portable media;
    a second computer for providing media-related information relating to contents of said portable media and method for displaying and outputting contents of the said portable media;
    and a network connecting said first and said second computers, whereby:
    at least a media-identifying information is recorded as said media-utilizing information to distinguish said media from each other;
    said first computer is provided at least, in addition to said media driving means, information displaying and outputting means for displaying and outputting information, first central control means for controlling overall operation and first information transmitting and receiving means for inputting and outputting to and from the network;
    said second computer at least comprises second central control means for controlling overall operation, information storage means for storing information, and second information transmitting and receiving means for inputting and outputting to and from the network;
    object and method information generating means for generating object and method information for defining data used for display and output of said media on said first computer and a display and output method based on said media-identifying information; and
    media-related information generating means for generating media-related information relating to contents of said media based on said media-identifying information and the information stored in said information storage means; and
    said information display and output means displays and outputs said media-related information and displays and outputs the data in said portable media in accordance with an instruction given in said object and method information.

2. A system for connecting portable media with a network according to claim 1, wherein a network address information capable to induce network address of the second computer is provided in addition to media-identifying information as a part of media-utilizing information, and network connection of said first computer with said second computer is automated.

3. A system for connecting portable media with a network according to claim 1, wherein utilization history information of the portable media is stored by the information storage means of the second computer, and the object and method information generating means generates object and method information using the media-identifying information of said portable media and said history information.

4. A system for connecting portable media with a network according to claim 3, wherein a user information capable to induce information relating to a character of major users of portable media is provided, in addition to the media-identifying information, a s a part of the media-utilizing information, and information relating to utilization of said portable media and the network is generated using said user information and the history information among the media-utilizing information in said second computer.

5. A system for connecting portable media with a network according to claim 1, wherein said first computer inquires contents of information transmitted thereto from the second computer.

6. A system for connecting portable media with a network according to claim 5, wherein an information provider contact information capable to induce the address to inquire is provided, in addition to the media-identifying information, as a part of the media-utilizing information, and said information provider contact information is utilized before inquiring as described in claim 5.

7. A system for connecting portable media with a network according to claim 1, wherein each of the first and the second computers is provided with means for exchanging user certifying information between said first and said second computers.

8. A system for connecting portable media with a network according to claim 1, wherein a part of the information in the portable media is encoded, a key data for decoding is transmitted from the second computer to the first computer, and the encoded information is decoded by the first computer using said key data for decoding.

9. A system for connecting portable media with a network according to claim 1, wherein a validity check value calculated using a part of the media-utilizing information is provided in a part of the media-utilizing information as a validity check information for checking validity of the portable media.

10. A system for connecting portable media with a network according to claim 9, wherein validity check value generating means for calculating the validity check value described in claim 9 is provided in the second computer or in another computer permitted by the second computer.

11. A system for connecting portable media with a network according to claim 9, wherein there is provided validity checking means for judging whether the portable media are valid or not using at least the validity check information and a part of the media-utilizing information other than said validity check information.

12. A system for connecting portable media with a network according to claim 1, wherein the information storage means stores all network addresses of the first computer connected with the second computer, and said second computer is provided with a function to judge whether a portable medium having the same media-identifying information is driven on the first computer having different network addresses.

13. A system for connecting portable media with a network according to claim 1, wherein the media-identifying information comprises a title information, which can uniquely specify at least title, issuer, year of issuance and contents of the portable medium and an issue number information added to each title information.

14. A system for connecting portable media and a network according to claim 1, wherein said portable medium is of rewritable type, utilization history information of said portable medium is stored in said portable medium itself by media driving means, said history information is transmitted from the first computer to the second computer, and the object and method information generating means generates object and method information using said transmitted history information and the media-identifying information.

15. A system for connecting portable media with a network according to claim 1, wherein said portable medium is of rewritable type and comprises:

utilization certifying information calculating means for calculating utilization certifying information by uni-directional function using a password inputted by a user and media-identifying information as argument;

a function to store the utilization certifying information calculated by said utilization certifying information calculating means to said portable medium as basic information for utilization certification using the media driving means; and a function to calculate utilization certifying information based on the password and said media-identifying information inputted when said portable medium is driven at said first computer and to compare the result of the calculation with the basic information for utilization certification stored in said portable medium and to judge whether they are equal to each other or not.

16. A method for connecting portable media with a network comprising the following steps:

a first computer transmits media-utilizing information, which is a part of information of portable media in use, to a second computer via a network;

said second computer receives said media-utilizing information;

said second computer generates object and method information for defining a method to display and output the data used for display and output of said portable media on said first computer using media-identifying information, which is a part of the information recorded in the received media-utilizing information and the data utilized for said display and output;

said second computer generates media-related information relating to said portable media using information stored in said second computer and said media-identifying information;

said second computer transmits said object and method information and said media-related information to said first computer via the network;

said first computer receives said transmitted object and method information and the media-related information; and said first computer displays and outputs said received media-related information and displays and outputs the data in said portable media in accordance with an instruction given in said received object and method information.

17. A system for connecting portable media with a network, having keywords for retrieval of relevant information relating to the data recorded in the portable media, at least comprising:

a first computer provided with media driving means for driving said portable media;

a second computer group for providing media-related information relating to contents of said portable media;

a third computer for retrieving an information providing server, which is a computer compatible with a retrieval condition among said second computer group; and a network connecting said first computer, said second computer group and said third computer; whereby:

said first computer at least comprises, in addition to said media driving means, first central control means for controlling overall operation, information display and output means for displaying and outputting the information, and first information transmitting and receiving means for inputting and outputting to and from the network;

said second computer group at least comprises, within each computer thereof, second central control means for controlling overall operation, information storage means for storing information, and second information transmitting and receiving means for inputting and outputting to and from the network; and said third computer at least comprises third central control means for controlling overall operation, third information transmitting and receiving means for inputting and outputting to and from the network, and server retrieval means for retrieving said information providing server based on said keywords;

wherein a media-utilizing information specific to each of the portable media is recorded, a title information is provided, which can uniquely specify at least title, issuer, year of issuance and contents of said portable media as a part of the media-utilizing information, the first computer transmits said media-utilizing information together with the keywords to the third computer, and said third computer retrieves network address of the information providing server using said transmitted keywords and the title information, which is a part of said media-utilizing information.

18. A system for connecting portable media with a network according to claim 17, wherein a thesaurus for retrieval corresponding to the title information of the portable media is provided.

19. A system for connecting portable media with a network, having keywords for retrieval of relevant information relating to the data recorded in the portable media, at least comprising:

a first computer provided with media driving means for driving said portable media;

a second computer group for providing media-related information relating to contents of said portable media;

a third computer for retrieving an information providing server, which is a computer compatible with a retrieval condition among said second computer group; and a network connecting said first computer, said second computer group and said third computer; whereby:

said first computer at least comprises, in addition to said media driving means, first central control means for controlling overall operation, information display and output means for displaying and outputting the information, and first information transmitting and receiving means for inputting and outputting to and from the network;

said second computer group at least comprises, within each computer thereof, second central control means for controlling overall operation, information storage means for storing information, and second information transmitting and receiving means for inputting and outputting to and from the network; and said third computer at least comprises third central control means for controlling overall operation, third information transmitting and receiving means for inputting and outputting to and from the network, and server retrieval means for retrieving said information providing server based on said keywords;

wherein said first computer comprises means for storing the information relating to a district where the first computer is used, said first computer transmits the information relating to said district together with the keywords to the third computer, and said third computer retrieves network address of the information providing server using said transmitted keywords and information relating to said district.

20. A system for connecting portable media with a network according to claim 19, wherein a thesaurus for retrieval and corresponding to the information relating to district is provided.

21. A system for connecting portable media with a network, having keywords for retrieval of relevant information relating to the data recorded in the portable media, at least comprising:

a first computer provided with media driving means for driving said portable media;

a second computer group for providing media-related information relating to contents of said portable media;

a third computer for retrieving an information providing server, which is a computer compatible with a retrieval condition among said second computer group; and a network connecting said first computer, said second computer group and said third computer; whereby:

said first computer at least comprises, in addition to said media driving means, first central control means for controlling overall operation, information display and output means for displaying and outputting the information, and first information transmitting and receiving means for inputting and outputting to and from the network;

said second computer group at least comprises, within each computer thereof, second central control means for controlling overall operation, information storage means for storing information, and second information transmitting and receiving means for inputting and outputting to and from the network; and said third computer at least comprises third central control means for controlling overall operation, third information transmitting and receiving means for inputting and outputting to and from the network, and server retrieval means for retrieving said information providing server based on said keywords;

wherein keywords used for retrieval are displayed and outputted to the first computer using information displaying and outputting means before starting the retrieval, unnecessary keywords are specified from said displayed and outputted keywords, and an information providing server is retrieved using remaining keywords except said specified unnecessary keywords.

22. A system for connecting portable media with a network according to claim 21, wherein the first computer has a function to store unnecessary keywords at all times and retrieves an information providing server without specifying unnecessary keywords each time.

23. A system for connecting portable media with a network according to claims 21 or 22, wherein each of the portable media is of rewritable type, and there is provided a function to store the unnecessary keywords as described in claims 21 or 22 in said portable medium itself.

24. A system for connecting portable media with a network, having keywords for retrieval of relevant information relating to the data recorded in the portable media, at least comprising:

a first computer provided with media driving means for driving said portable media;

a second computer group for providing media-related information relating to contents of said portable media;

a third computer for retrieving an information providing server, which is a computer compatible with a retrieval condition among said second computer group; and a network connecting said first computer, said second computer group and said third computer; whereby:

said first computer at least comprises, in addition to said media driving means, first central control means for controlling overall operation, information display and output means for displaying and outputting the information, and first information transmitting and receiving means for inputting and outputting to and from the network;

said second computer group at least comprises, within each computer thereof, second central control means for controlling overall operation, information storage means for storing information, and second information transmitting and receiving means for inputting and outputting to and from the network; and said third computer at least comprises third central control means for controlling overall operation, third information transmitting and receiving means for inputting and outputting to and from the network, and server retrieval means for retrieving said information providing server based on said keywords;

wherein, when the data in one of the portable media is displayed and outputted by information display and output means, said first computer comprises:

means for automatically starting retrieval without waiting for instruction for retrieval of an information providing server based on contents of said displayed and outputted data; and a function to display and output information as to whether retrieval result to said retrieval is present or not on the first computer by said information display and output means.

25. A system for connecting portable media with a network according to claim 24, wherein, in case retrieval result described in claim 24 is present, a part of the information of said retrieval result is displayed and outputted on the first computer.

26. A system for connecting portable media with a network, having keywords for retrieval of relevant information relating to the data recorded in the portable media, at least comprising:

a first computer provided with media driving means for driving said portable media;

a second computer group for providing media-related information relating to contents of said portable media;

a third computer for retrieving an information providing server, which is a computer compatible with a retrieval condition among said second computer group; and a network connecting said first computer, said second computer group and said third computer; whereby:

said first computer at least comprises, in addition to said media driving means, first central control means for controlling overall operation, information display and output means for displaying and outputting the information, and first information transmitting and receiving means for inputting and outputting to and from the network;

said second computer group at least comprises, within each computer thereof, second central control means for controlling overall operation, information storage means for storing information, and second information transmitting and receiving means for inputting and outputting to and from the network; and said third computer at least comprises third central control means for controlling overall operation, third information transmitting and receiving means for inputting and outputting to and from the network, and server retrieval means for retrieving said information providing server based on said keywords;

wherein there are provided a plurality of the third computers for retrieving an information providing server, which is a computer compatible with the retrieval condition from the second computer group;

and wherein media-utilizing information specific to each portable medium of the portable media is recorded on said portable medium in addition to keywords;

a network address information capable to induce all network addresses of a group of the plurality of the third computers is provided as a part of said media-utilizing information, the first computer comprises means for storing information relating to a district where the first computer is used, a retrieval server, which is a computer to be connected among said group of the plurality of the third computers, is determined using said information relating to the district where said first computer is used, and connection of said first computer with said retrieval server is automated.

27. A system for connecting portable media with a network, having keywords for retrieval of relevant information relating to the data recorded in the portable media, at least comprising:

a first computer provided with media driving means for driving said portable media;

a second computer group for providing media-related information relating to contents of said portable media;

a third computer for retrieving an information providing server, which is a computer compatible with a retrieval condition among said second computer group; and a network connecting said first computer, said second computer group and said third computer; whereby:

said first computer at least comprises, in addition to said media driving means, first central control means for controlling overall operation, information display and output means for displaying and outputting the information, and first information transmitting and receiving means for inputting and outputting to and from the network;

said second computer group at least comprises, within each computer thereof, second central control means for controlling overall operation, information storage means for storing information, and second information transmitting and receiving means for inputting and outputting to and from the network; and said third computer at least comprises third central control means for controlling overall operation, third information transmitting and receiving means for inputting and outputting to and from the network, and server retrieval means for retrieving said information providing server based on said keywords;

wherein there are provided a plurality of the third computers for retrieving an information providing server, which is a computer compatible with the retrieval condition from the second computer group;

and wherein media-utilizing information specific to each portable medium of the portable media is recorded on said portable medium in addition to keywords; and a network address information capable to induce network address of a representative retrieval server, which is a computer representative of a group of the plurality of the third computers, is provided as a part of said media-utilizing information, said first computer comprises means for storing information relating to a district where the first computer is used, said information relating to said district is transmitted to said representative retrieval server, said representative server determines a retrieval server, which is the third computer for optimal retrieval, in the district using said transmitted information relating to the district, and connection of said first computer with said retrieval server is automated.

28. A system for connecting portable media with a network according to claim 27, wherein the first computer comprises means for storing a network address of the retrieval server determined by the representative retrieval server, and connection of said first computer with said retrieval server is automated using said network address.

29. A system for connecting portable media with a network according to claim 28, wherein each of said portable media is of rewritable type, and the network address of the retrieval server described in claim 28 is stored in said portable medium itself.

30. A system for connecting portable media with a network, at least comprising:
   a first computer provided with media driving means for driving portable media each having prerecorded media-utilizing information specific to each; and
   a second computer for providing media-related information relating to contents of said portable media and method for displaying and outputting contents of the said portable media, said first and second computers being capable of communicating with each other through a network, whereby:
   at least a media-identifying information is recorded as said media-utilizing information to distinguish said media from the other;
   said first computer is provided at least, in addition to said media driving means, information displaying and outputting means for displaying and outputting information, first central control means for controlling overall operation and first information transmitting and receiving means for inputting and outputting to and from the network;
   said second computer at least having second central control means for controlling overall operation;
   information storage means for storing the information;
   second information transmitting and receiving means for inputting and outputting to and from the network;
   object and method information generating means for generating object and method information for defining data used for display and output of said media on said first computer and a display and output method based on said media-identifying information; and
   media-related information generating means for generating media-related information relating to contents of said media based on said media-identifying information and information stored in said information storage means;
   said information display and output means being arranged to display and output said media-related information and to display and output the data in said portable media in accordance with an instruction given in said object and method information.

31. A computer for use with a system for connecting portable media with a network, said computer comprising:
   media driving means for driving portable media g each having prerecorded media-utilizing information specific to each, said media-utilizing information having at least a media-identifying information to distinguish said media from the other;
   information displaying and outputting means for displaying, and outputting information;
   first central control means for controlling overall operation; and
   first information transmitting and receiving means for inputting and outputting to and from the network;
   said computer being capable of communicating with a second computer through said network;
   said second computer being arranged to provide media-related information relating to contents of said portable media and method for displaying and outputting contents of said portable media;
   said second computer having, second central control means for controlling overall operation;
   information storage means for storing the information;
   second information transmitting and receiving means for inputting and outputting to and from the network;
   object and method information generating means for generating object and method information for defining data used for display and output of said media on said first computer and a display and output method based on said media-identifying information; and
   media-related information generating means for generating media-related information relating to contents of said media based on said media-identifying information and information stored in said information storage means;
   said information display and output means being arranged to display and output said media-related information and to display and output the data in said portable media in accordance with an instruction given in said object and method information.

32. A server computer for use with a system for connecting portable media with a network, said server computer being communicable through a network with one or more client computers each having,
   media driving means for driving portable media each having prerecorded media-utilizing information specific to each, said media-utilizing information having at least a media-identifying information to distinguish said media from the other;
   information displaying and outputting means for displaying and outputting information;
   first central control means for controlling overall operation; and
   first information transmitting and receiving means for inputting and outputting to and from the network;
   said server computer being arranged to provide media-related information relating to contents of said portable media and method for displaying and outputting contents of said portable media;
   said server computer comprising:
   second central control means for controlling overall operation;
   information storage means for storing the information; and
   second information transmitting and receiving means for inputting and outputting to and from the network;
   object and method information generating means for generating object and method information for defining data used for display and output of said media on said client computer and a display and output method based on said media-identifying information; and
   media-related information generating means for generating media-related information relating to contents of said media based on said media-identifying information and information stored in said information storage means;
   said information display and output means being arranged to display and output said media-related information and to display and output the data in said portable media in accordance with an instruction given in said object and method information.

* * * * *